US012597635B2

(12) United States Patent
Mori et al.

(10) Patent No.: US 12,597,635 B2
(45) Date of Patent: Apr. 7, 2026

(54) ELECTROCHEMICAL DEVICE

(71) Applicant: MURATA MANUFACTURING CO., LTD., Kyoto (JP)

(72) Inventors: Daisuke Mori, Kyoto (JP); Ryuhei Matsumoto, Kyoto (JP); Yuri Nakayama, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 508 days.

(21) Appl. No.: 18/120,680

(22) Filed: Mar. 13, 2023

(65) Prior Publication Data

US 2023/0223525 A1 Jul. 13, 2023

Related U.S. Application Data

(63) Continuation of application No. PCT/JP2021/032921, filed on Sep. 1, 2021.

(30) Foreign Application Priority Data

Sep. 11, 2020 (JP) ................................ 2020-153157

(51) Int. Cl.
*H01M 10/054* (2010.01)
*H01M 4/38* (2006.01)
(Continued)

(52) U.S. Cl.
CPC ......... *H01M 10/054* (2013.01); *H01M 4/381* (2013.01); *H01M 10/0568* (2013.01);
(Continued)

(58) Field of Classification Search
CPC ................. H01M 4/366; H01M 4/381; H01M 2004/027; H01M 50/411
See application file for complete search history.

(56) References Cited

U.S. PATENT DOCUMENTS

2010/0151318 A1* 6/2010 Lopatin .................. H01M 4/13
427/78
2011/0159381 A1* 6/2011 Doe ........................ H01M 4/13
429/219

(Continued)

FOREIGN PATENT DOCUMENTS

CN 108140920 A * 6/2018
CN 110265712 A * 9/2019 .......... H01M 10/054

(Continued)

OTHER PUBLICATIONS

Japanese Office Action issued Feb. 6, 2024 in corresponding Japanese Application No. 2022-547611.

(Continued)

*Primary Examiner* — Amanda C. Walke
(74) *Attorney, Agent, or Firm* — K&L Gates LLP

(57) ABSTRACT

Provided is an electrochemical device including a negative electrode, a positive electrode, and a separator disposed between the negative electrode and the positive electrode. In the electrochemical device, the negative electrode is an electrode containing magnesium, and is in contact with a fullerene analogue-containing layer containing a fullerene analogue. The electrolytic solution of the electrochemical device includes a solvent and a magnesium salt contained in the solvent.

7 Claims, 13 Drawing Sheets

(51) Int. Cl.

| | |
|---|---|
| ***H01M 10/0568*** | (2010.01) |
| ***H01M 10/0569*** | (2010.01) |
| ***H01M 50/431*** | (2021.01) |
| *H01M 4/02* | (2006.01) |

(52) U.S. Cl.

CPC ..... *H01M 10/0569* (2013.01); *H01M 50/431* (2021.01); *H01M 2004/027* (2013.01)

(56) References Cited

U.S. PATENT DOCUMENTS

| | | | | |
|---|---|---|---|---|
| 2011/0318614 | A1 | 12/2011 | Takeshi et al. | |
| 2013/0252112 | A1 | 9/2013 | Doe et al. | |
| 2016/0308263 | A1* | 10/2016 | Shevchenko | H01M 10/052 |
| 2017/0005307 | A1* | 1/2017 | Kuratani | H01M 50/451 703/1 |
| 2017/0279151 | A1* | 9/2017 | Ling | H01M 4/466 |
| 2021/0265625 | A1 | 8/2021 | Matsumoto et al. | |

FOREIGN PATENT DOCUMENTS

| | | | | | |
|---|---|---|---|---|---|
| CN | 110311126 | A | * | 10/2019 | H01M 10/4235 |
| CN | 110336079 | A | * | 10/2019 | H01M 10/0568 |
| CN | 110444814 | A | * | 11/2019 | H01M 10/054 |
| CN | 110783551 | A | | 2/2020 | |
| DE | 102013227049 | A1 | * | 6/2015 | H01M 4/587 |
| EP | 3113275 | A1 | * | 1/2017 | H01M 10/0569 |
| JP | 2010192346 | A | | 9/2010 | |
| JP | 2015138581 | A | * | 7/2015 | |
| JP | 2016197598 | A | | 11/2016 | |
| JP | 2022178801 | A | * | 12/2022 | |
| KR | 20180052309 | A | * | 5/2018 | H01M 12/08 |
| KR | 101876665 | B1 | * | 7/2018 | H01M 4/134 |
| WO | WO-2019004220 | A1 | * | 1/2019 | H01M 4/36 |
| WO | 2020090946 | A1 | | 5/2020 | |

OTHER PUBLICATIONS

Japanese Office Action issued Jun. 25, 2024 in corresponding Japanese Application No. 2022-547611.

International Search Report of corresponding PCT application PCT/JP2021/032921, dated Oct. 19, 2021.

Vessally. E. et al.; A DFT study on nanocones, nanotubes ( 4.0), nanosheets and fullerene C60 as anodes in Mg-ion batteries; RSC Advances; Jan. 8, 2019, vol. 9. pp. 853-862. (10 pages.).

Office Action issued for corresponding Chinese Patent Application No. 202180062421.5, dated Oct. 23, 2025. (3 pages.).

Search Report issued for corresponding Chinese Patent Application No. 202180062421.5, dated Oct. 21, 2025. (2 pages.).

* cited by examiner

ELECTROCHEMICAL DEVICE

CROSS REFERENCE TO RELATED APPLICATIONS

The present application is a continuation of PCT patent application no. PCT/JP2021/032921, filed on Sep. 1, 2021, which claims priority to Japanese patent application no. JP2020-153157, filed on Sep. 11, 2020, the entire contents of which are incorporated herein by reference.

BACKGROUND

The present application relates to an electrochemical device.

Electrochemical devices include capacitors, air batteries, fuel cells, secondary batteries, and the like, and are used for various purposes. Such an electrochemical device includes a positive electrode and a negative electrode, and contains an electrolytic solution responsible for ion transport between the positive electrode and the negative electrode.

For example, as the electrode of the electrochemical device expressed by magnesium batteries, an electrode made of magnesium or an electrode including at least magnesium is provided (in the following, such an electrode is also referred to as an "electrode containing magnesium" or simply a "magnesium electrode", and an electrochemical device using an electrode containing magnesium is also referred to as "a magnesium electrode-based electrochemical device"). Magnesium is more resource-rich and much inexpensive than lithium. In addition, magnesium generally has a large amount of electricity per unit volume that can be extracted by a redox reaction, and is highly safe when used in an electrochemical device. Thus, magnesium batteries are drawing attention as a next-generation secondary battery to replace lithium ion batteries.

SUMMARY

The present application relates to an electrochemical device.

Problems exist with magnesium battery technology.

For example, improvement in cycle characteristics is one of the important issues in magnesium batteries in which magnesium is used for a negative electrode. In this regard, although it is conceivable to deal with this issue depending on the type of Mg electrolytic solution, positive electrode material, etc., the current situation is that improvement for improving the cycle characteristics is still desired.

Although lithium ion batteries, which are widely used as secondary batteries, can be improved in their cycle characteristics by an additive of an electrolytic solution, it is difficult to cope with magnesium batteries likewise by similar additives. This is because a Mg coordination structure is very fragile in the electrolytic solution of a magnesium battery and the activity of Mg precipitation/dissolution tends to be impaired by an additive for a lithium ion battery. That is, it is usually difficult to improve the cycle characteristics of the electrolytic solution of a magnesium battery.

In addition, improvement in energy density in magnesium batteries is also an important issue. In particular, the discharge voltage at the time of initial discharge may be dropped by negative electrode overvoltage, and such voltage drop cannot be sufficiently controlled.

The present application relates to overcoming problems associated with magnesium battery technology including those problems described herein.

The present application relates to providing, in an embodiment, an electrochemical device including an electrode containing magnesium, the electrochemical device being further improved in cycle characteristics and having a higher energy density.

In an embodiment, provided is an electrochemical device comprising a negative electrode, a positive electrode, and a separator disposed between the negative electrode and the positive electrode, wherein the negative electrode is an electrode containing magnesium, an electrolytic solution of the electrochemical device comprises a solvent and a magnesium salt contained in the solvent, and the negative electrode is in contact with a fullerene analogue-containing layer comprising a fullerene analogue.

The electrochemical device, in an embodiment, affords an electrochemical device having improved cycle characteristics and energy density. That is, the electrochemical device, in an embodiment, is so-called "magnesium electrode-based", but has further improved cycle characteristics and energy density. The improved cycle characteristics and energy density make the magnesium electrode-based electrochemical device more suitable for use in real environment.

The effect described in the present description is just an example and is not restrictive, and additional effects may be realized.

DETAILED DESCRIPTION

Figure 1:
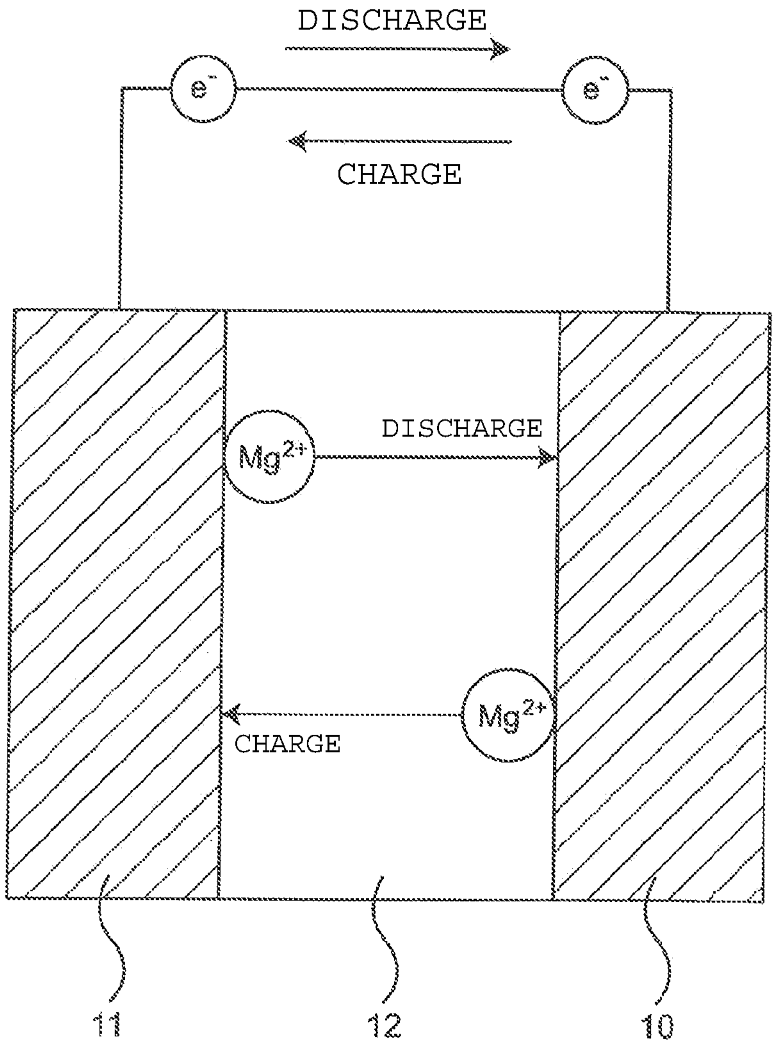
FIG. 1 is a conceptual diagram of a magnesium electrode-based electrochemical device (particularly a battery) according to an embodiment of the present application.

Hereinafter, an "electrochemical device" according to an embodiment of the present application will be described in further detail. Although description will be made with reference to the drawings as necessary, the shown contents are only schematically and exemplarily illustrated for the understanding of the present application, and the appearance, the dimensional ratio, and the like may be different from the actual ones.

The various numerical ranges referred to herein are intended to include the lower and upper numerical values (namely, the upper limit value and the lower limit value) themselves, unless otherwise stated, such as "less than", "greater than", and "smaller than". That is, taking a numerical range such as 1 to 10 as an example, the numerical range 1 to 10 is interpreted as including the lower limit value "1" and also including the upper limit value "10".

In the present application, the term "electrochemical device" means, in a broad sense, a device capable of extracting energy by utilizing electrochemical reactions. In a narrow sense, the "electrochemical device" in the present application means a device including a pair of electrodes and an electrolyte, and in particular, a device that is charged and discharged as ions move. Examples of the electrochemical device include a capacitor, an air battery, and a fuel cell as well as a secondary battery, which are merely examples.

An electrochemical device according to an embodiment is a device capable of extracting energy by utilizing electrochemical reactions.

The electrochemical device according to an embodiment is an electrochemical device comprising a negative electrode, a positive electrode, and a separator disposed between the negative electrode and the positive electrode. As will be described in detail later, in the electrochemical device according to an embodiment, it is preferable that the negative electrode is an electrode containing magnesium and the positive electrode is an electrode containing sulfur, that is, a sulfur electrode. That is, in a preferred mode, the electrochemical device according to an embodiment is an electrochemical device with a magnesium (Mg)—sulfur (S) electrode.

The term "sulfur electrode" used in the present description refers, in a broad sense, to an electrode containing sulfur (S) as an active component (that is, an active material). In a narrow sense, the term "sulfur electrode" refers to an electrode containing at least sulfur, and for example, to an electrode containing sulfur (S), such as $S_8$ and/or polymeric sulfur, and especially to such a positive electrode.

The sulfur electrode may contain a component other than sulfur, and may contain, for example, a conductive aid and/or a binder. The content of sulfur in the sulfur electrode may be, as just an example, 5% by mass or more and 95% by mass or less based on the entire electrode, and may be, for example, 70% by mass or more and 90% by mass or less Examples of the conductive aid include carbon materials such as graphite, carbon fiber, carbon black, and carbon nanotube, and these may be used singly or two or more thereof may be used in mixture. As the carbon fiber, for example, a vapor growth carbon fiber (VGCF (registered trademark)) can be used. As the carbon black, for example, acetylene black and/or Ketjen black can be used. As the carbon nanotube, for example, a single-wall carbon nanotube (SWCNT) and/or a multi-wall carbon nanotube (MWCNT) such as a double-wall carbon nanotube (DWCNT) can be used. A material other than the carbon materials can also be used as long as the material has good conductivity. For example, a metal material such as a Ni powder, and/or a conductive polymer material or the like can also be used.

Examples of the binder include polymer resins such as a fluorine-based resin (e.g., polyvinylidene difluoride (PVdF) and/or polytetrafluoroethylene (PTFE)), a polyvinyl alcohol (PVA)-based resin, and/or a styrene-butadiene copolymerization rubber (SBR)-based resin. In addition, a conductive polymer may also be used as the binder. As the conductive polymer, for example, substituted or unsubstituted polyaniline, polypyrrole and polythiophene, and a (co)polymer composed of one or two components selected therefrom may be used.

The term "electrode containing magnesium" used in the present description refers, in a broad sense, to an electrode having magnesium (Mg) as an active component (that is, an active material). In a narrow sense, the term "electrode containing magnesium" refers to an electrode composed of magnesium, for example, an electrode containing magnesium metal or magnesium alloy, particularly such a negative electrode. Although such an electrode containing magnesium may contain a component other than magnesium metal or magnesium alloy, in a preferred mode, this electrode is an electrode composed of a metal body of magnesium (for example, an electrode composed of a simple substance of magnesium metal having a purity of 90% or more, preferably a purity of 95% or more, and more preferably a purity of 98% or more).

The material constituting the negative electrode (specifically, the negative electrode active material) is preferably composed of magnesium metal alone, a magnesium alloy or a magnesium compound because of an "electrode containing magnesium". When the negative electrode is composed of a simple substance of magnesium metal (for example, a magnesium plate), a Mg purity of the simple substance is 90% or more, preferably 95% or more, and more preferably 98% or more. The negative electrode can be produced from, for example, a plate-like material or a foil-like material, but is not limited thereto, and can be formed (shaped) using a powder.

The negative electrode may have a structure in which a negative electrode active material layer is formed in the vicinity of the surface the negative electrode. For example, the negative electrode may be a negative electrode having a layer with magnesium ion conductivity containing magnesium (Mg) and further containing at least any of carbon (C), oxygen (O), sulfur (S), and halogen as a negative electrode active material layer. Such a negative electrode active material layer may be one having a single peak derived from magnesium in the range of 40 eV or more and 60 eV or less, though this is merely an example. Examples of the halogen include at least one selected from the group consisting of fluorine (F), chlorine (Cl), bromine (Br), and iodine (I). In such a case, the negative electrode active material layer may have a single peak derived from magnesium in the range of 40 eV or more and 60 eV or less over a region from the front surface of the negative electrode active material layer to a depth of $2\times10^{-7}$ m in a direction perpendicular to the front surface (depth direction). This is because the negative electrode active material layer exhibits good electrochemical activity from the surface to the inside thereof. For the same reason, the oxidation state of magnesium may be substantially constant over $2\times10^{-7}$ m in the depth direction from the front surface of the negative electrode active material layer. Here, the front surface of the negative electrode active material layer means a surface on a side constituting a surface of the electrode of both surfaces of the negative electrode active material layer, and the rear surface of the negative electrode active material layer means a surface on a side opposite from the front surface, that is, a surface on a side constituting an interface between a current collector and the negative electrode active material layer. Whether or not the negative electrode active material layer contains the above elements can be examined based on an X-ray photoelectron spectroscopy (XPS) method. The fact that the negative electrode active material layer has the peak and the fact that the negative electrode active material layer has the oxidation state of magnesium can also be confirmed similarly based on the XPS method.

In the electrochemical device according to an embodiment, the positive electrode and the negative electrode are separated by a separator which allows magnesium ions to pass therethrough while preventing a short circuit due to contact between both the electrodes. Such a separator may be an inorganic separator and/or an organic separator. Examples of the inorganic separator include a glass filter and glass fiber. Examples of the organic separator include a porous membrane made of a synthetic resin comprising polytetrafluoroethylene, polypropylene, and/or polyethylene, and the organic separator may have a structure in which two or more types of such porous membranes are laminated. Above all, a porous membrane made of polyolefin is preferable because this is superior in short-circuit prevention effect and can improve the safety of batteries by a shutdown effect.

In the electrochemical device according to an embodiment, the negative electrode is in contact with a fullerene analogue-containing layer. In an embodiment, since the negative electrode of the electrochemical device is in contact with a fullerene analogue, cycle characteristics and energy density can be improved.

The layer in the fullerene analogue-containing layer may be a layer continuously covering the object to be covered or a layer covering in part the object to be covered. Examples of the mode in which the fullerene analogue-containing layer is in contact with the negative electrode include a mode in which the fullerene analogue-containing layer is a cover layer covering the negative electrode (the first mode) and a mode in which the fullerene analogue-containing layer is a separator (the second mode). The first mode and the second mode may be combined. When the fullerene analogue-containing layer is a separator and/or a cover layer covering the negative electrode, the magnesium electrode-based electrochemical device according to an embodiment more easily exhibits higher cycle characteristics and higher energy density.

In the first mode, the fullerene analogue-containing layer is a cover layer covering the negative electrode. The fullerene analogue-containing layer comprises a fullerene analogue and may be made of the fullerene analogue. For example, the fullerene analogue-containing layer may continuously cover a surface of the negative electrode, or may cover in part the surface of the negative electrode and allow part of the surface of the negative electrode to be exposed. The mode in which the surface of the negative electrode is continuously or in part covered can be confirmed with, for example, an electron microscope. The "fullerene analogue" can be identified by visible/ultraviolet absorption spectroscopy (UV), infrared absorption spectroscopy (IR), nuclear magnetic resonance spectroscopy (NMR), and/or mass spectrometry (MS (including GC-MS and/or LS-MS)).

When the fullerene analogue-containing layer contains a fullerene analogue, the fullerene analogue may be contained in an amount of, for example, 90% by weight or more, 95% by weight or more, 97% by weight or more, 98% by weight or more, 99% by weight or more, 99.5% by weight or more, 99.9% by weight or more, or 99.95% by weight or more of the total mass of the fullerene analogue-containing layer.

Figure 14:
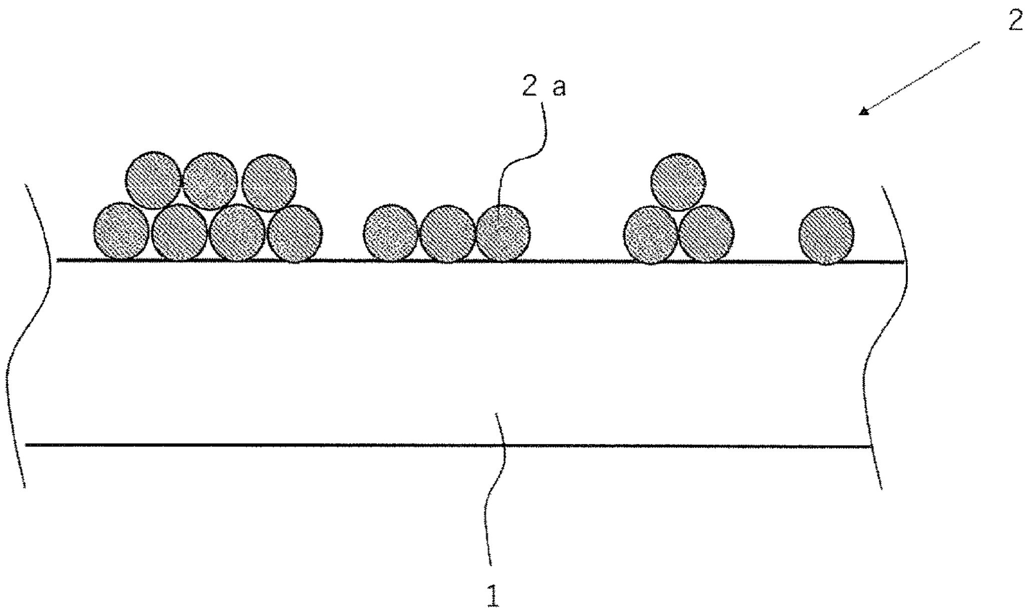
FIG. 14 is a schematic sectional view illustrating a mode in which a fullerene analogue-containing layer covers a negative electrode in part.

One example of the latter mode (that is, of the first mode, a mode in which the fullerene analogue-containing layer is a cover layer covering in part the negative electrode) will be described with reference to FIG. 14. FIG. 14 is a schematic sectional view illustrating a mode in which a fullerene analogue-containing layer covers a negative electrode in part. When the fullerene analogue-containing layer 2 is formed of particles containing a plurality of fullerene analogues (hereinafter, also referred to as "fullerene analogue particles") 2*a*, the plurality of fullerene analogue particles 2*a* are two-dimensionally connected on a surface of the negative electrode 1. The fullerene analogue particles 2*a* adjacent to each other are in contact with each other. Some of the plurality of fullerene analogue particles 2*a* are separated from each other, and part of the surface of the negative electrode 1 is exposed at the separated portion. The fullerene analogue-containing layer 2 may be configured by stacking fullerene analogue particles 2*a* in a direction perpendicular to the surface of the negative electrode. Such a fullerene analogue-containing layer 2 can be formed, for example, by dropping a dispersion of fullerene analogue particles 2*a* on the surface of the negative electrode 1 to form a coating film, and drying the coating film. The fullerene analogue particles 2*a* may be dispersed in a state of primary particles in the dispersion, or may be dispersed in a state of secondary particles in which primary particles are aggregated to form aggregates.

In the second mode, the fullerene analogue-containing layer is a separator. In the electrochemical device according to an embodiment, owing to a structure in which the separator a surface of which is at least in part covered with the fullerene analogue is in contact with the negative electrode, the negative electrode is in contact with the fullerene analogue. For example, when the separator has a plurality of pores and the fullerene analogue-containing layer is formed of a plurality of fullerene analogue particles, the surface of the separator is continuously or in part covered similarly to the first mode, and the fullerene analogue particles may enter or fit into the pores.

In an embodiment, the expression "the cycle characteristics and the energy density are improved" means that in a magnesium electrode-based electrochemical device which includes a "negative electrode in contact with a fullerene analogue-containing layer" and in which an electrolytic solution containing a "magnesium salt" is charged, the cycle characteristics and the energy density are improved over those of the same magnesium electrode-based electrochemical device except that the "negative electrode in contact with a fullerene analogue-containing layer" is not included. In the cycle characteristics, in particular, that expression means that a discharge capacity retention ratio when a charge/discharge cycle is repeated becomes relatively high (see FIG. 13). In the energy density, in particular, that expression means that the discharge voltage becomes relatively high (see FIGS. 10 to 11).

Here, the "cycle characteristics" in the present description means, in a broad sense, characteristics in which a decrease in discharge capacity is more sufficiently controlled by repeated charge and discharge. In a narrow sense, the "cycle characteristics" refer to characteristics based on the discharge capacity retention ratio obtained by the following cycle test, and the expression "cycle characteristics are improved" means that the discharge capacity retention ratio is relatively high.

The cycle test is carried out in a thermostatic bath at 25° C. For discharge, constant current discharge is carried out with a current value of 0.1 mA up to a discharge end voltage of 0.7 V. After resting for 1 hour after the discharge, charge is started. For the charge, constant current discharge is carried out with a current value of 0.1 mA up to a charge end voltage of 2.2 V, and a 1 hour pause is made after the charge. This charge/discharge cycle is repeated 20 times. In such a case, the ratio of the cell discharge capacity after the cycle to the initial discharge capacity is defined as a capacity retention ratio after the cycle.

Here, the "energy density" in the present description means, in a broad sense, a characteristic that a decrease in discharge voltage (voltage drop) due to negative electrode overvoltage is more sufficiently controlled. In a narrow sense, the "energy density " refers to a characteristic based on a discharge voltage obtained by the cycle test (in particular, the discharge voltage at the first cycle), and the expression "energy density is improved" means that the discharge voltage is relatively high.

In a magnesium electrode-based electrochemical device which includes a negative electrode in contact with a fullerene analogue-containing layer and in which an electrolytic solution containing a magnesium salt is charged, the cycle characteristics and the energy density thereof can be improved. This is true especially when the electrochemical device includes a sulfur electrode as a positive electrode. That is, the positive electrode of the electrochemical device according to an embodiment is preferably a sulfur electrode. In the case of an electrochemical device including such a magnesium electrode-sulfur electrode pair (hereinafter, also referred to as "magnesium-sulfur electrode-based electrochemical device" or "Mg-S battery"), the effect of further improving the cycle characteristics and the energy density of the electrochemical device according to an embodiment can be exhibited. As the cycle characteristics and the energy density become higher in this manner, suitability for use of the magnesium-sulfur electrode-based electrochemical device in the real environment becomes higher, and it becomes easier to achieve a device in a more desirable manner. Assuming that the magnesium-sulfur electrode-based electrochemical device is a secondary battery, the possibility of a Mg-S battery more suitable for practical use has been found according to an embodiment.

The fullerene analogue is, for example, an unsubstituted fullerene or a fullerene derivative. The unsubstituted fullerene is, for example, at least one fullerene selected from the group consisting of $C_{60}$ (Chemical Formula 1) , $C_{70}$, $C_{84}$, $C_{90}$, and $C_{96}$. When the fullerene analogue is at least one fullerene selected from the group consisting of $C_{60}$, $C_{70}$, $C_{84}$, $C_{90}$, and $C_{96}$, the magnesium electrode-based electrochemical device according to an embodiment more easily exhibits higher cycle characteristics and higher energy density. The fullerene derivative is a fullerene resulting from addition or substitution of an unsubstituted fullerene with a functional group. The number of the functional groups to be added or substituted is, for example, an integer of 1 to 10. Such a functional group is, for example, at least one functional group selected from the group consisting of an alkyl group, an alkenyl group, a cycloalkyl group, an alkoxy group, an aryl group, an amino group, a hydroxyl group, a nitro group, an acyl group, and a halogen group. Among them, the fullerene analogue is preferably an unsubstituted fullerene, and more preferably $C_{60}$.

[Chemical Formula 1]

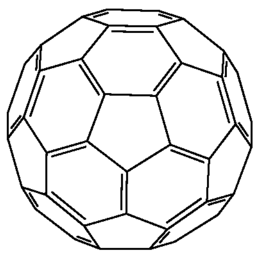

The fullerene analogue may be one selected from the group consisting of unsubstituted fullerenes and fullerene derivatives, or may be a combination of two or more thereof. When two or more fullerene analogues are combined, one of the two or more fullerene analogues may be contained in the fullerene analogues as a main component. Here, in the present description, the main component refers to a component contained in an amount of 90% by weight or more, 95% by weight or more, 97% by weight or more, 98% by weight or more, 99% by weight or more, 99.5% by weight or more, 99.9% by weight or more, or 99.95% by weight or more of the total content of the fullerene analogues. For example, when the fullerene analogue is composed of $C_{60}$ and an unsubstituted fullerene other than $C_{60}$, the fullerene analogue may contain $C_{60}$ in an amount of 99.5% by weight or more of the fullerene analogue layer content.

In the electrochemical device according to an embodiment, the electrolytic solution contains at least a solvent and a magnesium salt contained in the solvent.

The solvent is, for example, at least one solvent selected from the group consisting of a linear ether, a cyclic ether, and a dialkylsulfone. When the solvent is at least one solvent selected from the group consisting of a linear ether, a cyclic ether, and a dialkylsulfone, the magnesium electrode-based electrochemical device according to an embodiment more easily exhibits higher cycle characteristics and higher energy density.

The linear ether is, for example, an ether having an ethyleneoxy structural unit represented by a general formula:

[Chemical Formula 2]

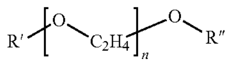

wherein R' and R" are each independently a hydrocarbon group having 1 to 10 carbon atoms, and may be the same or different from each other, and n is an integer of 1 to 10. When the linear ether is an ether having an ethyleneoxy structural unit represented by the above general formula, the magnesium electrode-based electrochemical device according to an embodiment more easily exhibits higher cycle characteristics and higher energy density.

The linear ether solvent to be used for the magnesium electrode-based electrolytic solution according to an embodiment has one or more ethyleneoxy structural units. The term "ethyleneoxy structural unit" as used herein refers to a molecular structural unit ($—O—C_2H_4—$) in which an ethylene group and an oxygen atom are bonded, and one or more such molecular structural units are contained in the linear ether. For example, when one ethyleneoxy structural unit is contained, the linear ether solvent may be such a linear ether as dimethoxyethane/DME (ethylene glycol dimethyl ether) and/or diethoxyethane/DEE (ethylene glycol diethyl ether).

In one preferred mode, there is one ethyleneoxy structure, in other words, the linear ether is dimethoxyethane. In a preferred mode, two or more molecular structural units ($—O—C_2H_4—$) are contained in the linear ether. In other words, it can be said that the linear ether in the magnesium electrode-based electrolytic solution preferably has a structure in which two or more molecules of glycol are dehydration-condensed.

R' and R" in the above general formula of the linear ether each independently represent a hydrocarbon group. Thus, R' and R" may each independently be an aliphatic hydrocarbon group, an aromatic hydrocarbon group and/or an araliphatic hydrocarbon group. Here, the term "linear ether" in the present description means that at least the moiety of the ethyleneoxy structural unit is not branched (that is, does not have a branched structure). This means that R' and R" in the above general formula of the linear ether do not necessarily have a linear structure and may have a branched structure. In a preferred mode, the linear ether to be used in the magnesium electrode-based electrolytic solution according to an embodiment is a glycol-based ether in which the moiety of the ethyleneoxy structural unit does not have a branched structure and R' and R" also have no branched structure.

Preferably, when the linear ether has the "ethyleneoxy structural unit" as described above, the cycle characteristics and the energy density in the magnesium electrode-based electrochemical device are easily improved in combination with the "negative electrode in contact with the fullerene analogue-containing layer". That is, in the electrolytic solution, the coexistence of the solvent composed of the linear ether having at least the "ethyleneoxy structural unit" with the "negative electrode in contact with the fullerene analogue-containing layer" can produce not a little favorable effect can be provided on the cycle characteristics and the energy density.

In addition, when the linear ether has "two or more ethyleneoxy structural units", the cycle characteristics and the energy density in the magnesium electrode-based electrochemical device are more easily improved in combination with the presence of the "negative electrode in contact with the fullerene analogue-containing layer". That is, in the electrolytic solution, the coexistence of the solvent composed of the linear ether having at least "two or more ethyleneoxy structural units" with the "negative electrode in contact with the fullerene analogue-containing layer" can produce a significant effect on the cycle characteristics and the energy density. This is considered to be because the "negative electrode in contact with the fullerene analogue-containing layer" effectively acts on the cycle characteristics and the energy density of the magnesium electrode-based electrochemical device in combination with the linear ether solvent having "two or more ethyleneoxy structural units" and containing a magnesium salt.

The linear ether having two or more ethyleneoxy structural units is not particularly limited and examples thereof include diethylene glycol-based ethers, triethylene glycol-based ethers, tetraethylene glycol-based ethers, pentaethylene glycol-based ethers, and hexaethylene glycol-based ethers. Similarly, the linear ether having two or more ethyleneoxy structural units may be a heptaethylene glycol-based ether, an octaethylene glycol-based ether, a nonaethylene glycol-based ether, a decaethylene glycol-based ether, or the like, and may further be a polyethylene glycol-based ether having more ethyleneoxy structural units.

In a preferred mode of the linear ether in an embodiment, a hydrocarbon group having 1 to 10 carbon atoms is an aliphatic hydrocarbon group. That is, in the linear ether contained in the magnesium electrode-based electrolytic solution according to an embodiment, R' and R" in the general formula may each independently be an aliphatic hydrocarbon group having 1 to 10 carbon atoms. The linear ether in the preferred mode is not particularly limited, and examples thereof include ethylene glycol-based ethers, diethylene glycol-based ethers, triethylene glycol-based ethers, tetraethylene glycol-based ethers, pentaethylene glycol-based ethers, and hexaethylene glycol-based ethers as disclosed below. Similarly, the linear ether in the preferred mode may be a heptaethylene glycol-based ether, an octaethylene glycol-based ether, a nonaethylene glycol-based ether, or a decaethylene glycol-based ether. Among them, R' and R" in the general formula are each independently preferably an aliphatic hydrocarbon group having 1 to 4 carbon atoms (e.g., lower alkyl groups having 1 to 4 carbon atoms such as a methyl group, an ethyl group, a n-propyl group, an isopropyl group, and a n-butyl group).

Examples of the ethylene glycol-based ether include ethylene glycol dimethyl ether, ethylene glycol ethyl methyl ether, ethylene glycol methyl propyl ether, ethylene glycol butyl methyl ether, ethylene glycol methyl pentyl ether, ethylene glycol methyl hexyl ether, ethylene glycol methyl heptyl ether, and ethylene glycol methyl octyl ether;

ethylene glycol diethyl ether, ethylene glycol ethyl propyl ether, ethylene glycol butyl ethyl ether, ethylene glycol ethyl pentyl ether, ethylene glycol ethyl hexyl ether, ethylene glycol ethyl heptyl ether, and ethylene glycol ethyl octyl ether;

ethylene glycol dipropyl ether, ethylene glycol butyl propyl ether, ethylene glycol propyl pentyl ether, ethylene glycol propyl hexyl ether, ethylene glycol propyl heptyl ether, and ethylene glycol propyl octyl ether;

ethylene glycol dibutyl ether, ethylene glycol butyl pentyl ether, ethylene glycol butyl hexyl ether, ethylene glycol butyl heptyl ether, and ethylene glycol butyl octyl ether;

ethylene glycol dipentyl ether, ethylene glycol hexyl pentyl ether, ethylene glycol heptyl pentyl ether, and ethylene glycol octyl pentyl ether;

ethylene glycol dihexyl ether, ethylene glycol heptyl hexyl ether, and ethylene glycol hexyl octyl ether;

ethylene glycol diheptyl ether and ethylene glycol heptyl octyl ether; and ethylene glycol dioctyl ether.

Examples of the diethylene glycol-based ether include diethylene glycol dimethyl ether, diethylene glycol ethyl methyl ether, diethylene glycol methyl propyl ether, diethylene glycol butyl methyl ether, diethylene glycol methyl pentyl ether, diethylene glycol methyl hexyl ether, diethylene glycol methyl heptyl ether, and diethylene glycol methyl octyl ether;

diethylene glycol diethyl ether, diethylene glycol ethyl propyl ether, diethylene glycol butyl ethyl ether, diethylene glycol ethyl pentyl ether, diethylene glycol ethyl hexyl ether, diethylene glycol ethyl heptyl ether, and diethylene glycol ethyl octyl ether;

diethylene glycol dipropyl ether, diethylene glycol butyl propyl ether, diethylene glycol propyl pentyl ether, diethylene glycol propyl hexyl ether, diethylene glycol propyl heptyl ether, and diethylene glycol propyl octyl ether;

diethylene glycol dibutyl ether, diethylene glycol butyl pentyl ether, diethylene glycol butyl hexyl ether, diethylene glycol butyl heptyl ether, and diethylene glycol butyl octyl ether;

diethylene glycol dipentyl ether, diethylene glycol hexyl pentyl ether, diethylene glycol heptyl pentyl ether, and diethylene glycol octyl pentyl ether;

diethylene glycol dihexyl ether, diethylene glycol heptyl hexyl ether, and diethylene glycol hexyl octyl ether;

diethylene glycol diheptyl ether and diethylene glycol heptyl octyl ether; and diethylene glycol dioctyl ether.

Examples of the triethylene glycol-based ether include triethylene glycol dimethyl ether, triethylene glycol ethyl methyl ether, triethylene glycol methyl propyl ether, triethylene glycol butyl methyl ether, triethylene glycol methyl pentyl ether, triethylene glycol methyl hexyl ether, triethylene glycol methyl heptyl ether, and triethylene glycol methyl octyl ether;

triethylene glycol diethyl ether, triethylene glycol ethyl propyl ether, triethylene glycol butyl ethyl ether, triethylene glycol ethyl pentyl ether, triethylene glycol ethyl hexyl ether, triethylene glycol ethyl heptyl ether, and triethylene glycol ethyl octyl ether;

triethylene glycol dipropyl ether, triethylene glycol butyl propyl ether, triethylene glycol propyl pentyl ether, triethylene glycol propyl hexyl ether, triethylene glycol propyl heptyl ether, and triethylene glycol propyl octyl ether;

triethylene glycol dibutyl ether, triethylene glycol butyl pentyl ether, triethylene glycol butyl hexyl ether, triethylene glycol butyl heptyl ether, and triethylene glycol butyl octyl ether;

triethylene glycol dipentyl ether, triethylene glycol hexyl pentyl ether, triethylene glycol heptyl pentyl ether, and triethylene glycol octyl pentyl ether;

triethylene glycol dihexyl ether, triethylene glycol heptyl hexyl ether, and triethylene glycol hexyl octyl ether;

triethylene glycol diheptyl ether and triethylene glycol heptyl octyl ether; and triethylene glycol dioctyl ether.

Examples of the tetraethylene glycol-based ether include tetraethylene glycol dimethyl ether, tetraethylene glycol ethyl methyl ether, tetraethylene glycol methyl propyl ether, tetraethylene glycol butyl methyl ether, tetraethylene glycol methyl pentyl ether, tetraethylene glycol methyl hexyl ether, tetraethylene glycol methyl heptyl ether, and tetraethylene glycol methyl octyl ether;

tetraethylene glycol diethyl ether, tetraethylene glycol ethyl propyl ether, tetraethylene glycol butyl ethyl ether, tetraethylene glycol ethyl pentyl ether, tetraethylene glycol ethyl hexyl ether, tetraethylene glycol ethyl heptyl ether, and tetraethylene glycol ethyl octyl ether;

tetraethylene glycol dipropyl ether, tetraethylene glycol butyl propyl ether, tetraethylene glycol propyl pentyl ether, tetraethylene glycol propyl hexyl ether, tetraethylene glycol propyl heptyl ether, and tetraethylene glycol propyl octyl ether;

tetraethylene glycol dibutyl ether, tetraethylene glycol butyl pentyl ether, tetraethylene glycol butyl hexyl ether, tetraethylene glycol butyl heptyl ether, and tetraethylene glycol butyl octyl ether;

tetraethylene glycol dipentyl ether, tetraethylene glycol hexyl pentyl ether, tetraethylene glycol heptyl pentyl ether, and tetraethylene glycol octyl pentyl ether;

tetraethylene glycol dihexyl ether, tetraethylene glycol heptyl hexyl ether, and tetraethylene glycol hexyl octyl ether;

tetraethylene glycol diheptyl ether and tetraethylene glycol heptyl octyl ether; and tetraethylene glycol dioctyl ether.

Examples of the pentaethylene glycol-based ether include pentaethylene glycol dimethyl ether, pentaethylene glycol ethyl methyl ether, pentaethylene glycol methyl propyl ether, pentaethylene glycol butyl methyl ether, pentaethylene glycol methyl pentyl ether, pentaethylene glycol methyl hexyl ether, pentaethylene glycol methyl heptyl ether, and pentaethylene glycol methyl octyl ether;

pentaethylene glycol diethyl ether, pentaethylene glycol ethyl propyl ether, pentaethylene glycol butyl ethyl ether, pentaethylene glycol ethyl pentyl ether, pentaethylene glycol ethyl hexyl ether, pentaethylene glycol ethyl heptyl ether, and pentaethylene glycol ethyl octyl ether;

pentaethylene glycol dipropyl ether, pentaethylene glycol butyl propyl ether, pentaethylene glycol propyl pentyl ether, pentaethylene glycol propyl hexyl ether, pentaethylene glycol propyl heptyl ether, and pentaethylene glycol propyl octyl ether;

pentaethylene glycol dibutyl ether, pentaethylene glycol butyl pentyl ether, pentaethylene glycol butyl hexyl ether, pentaethylene glycol butyl heptyl ether, pentaethylene glycol butyl octyl ether;

pentaethylene glycol dipentyl ether, pentaethylene glycol hexyl pentyl ether, pentaethylene glycol heptyl pentyl ether, and pentaethylene glycol octyl pentyl ether;

pentaethylene glycol dihexyl ether, pentaethylene glycol heptyl hexyl ether, and pentaethylene glycol hexyl octyl ether;

pentaethylene glycol diheptyl ether and pentaethylene glycol heptyl octyl ether; and pentaethylene glycol dioctyl ether.

Examples of the hexaethylene glycol-based ether include hexaethylene glycol dimethyl ether, hexaethylene glycol ethyl methyl ether, hexaethylene glycol methyl propyl ether, hexaethylene glycol butyl methyl ether, hexaethylene glycol methyl pentyl ether, hexaethylene glycol methyl hexyl ether, hexaethylene glycol methyl heptyl ether, and hexaethylene glycol methyl octyl ether;

hexaethylene glycol diethyl ether, hexaethylene glycol ethyl propyl ether, hexaethylene glycol butyl ethyl ether, hexaethylene glycol ethyl pentyl ether, hexaethylene glycol ethyl hexyl ether, hexaethylene glycol ethyl heptyl ether, and hexaethylene glycol ethyl octyl ether;

hexaethylene glycol dipropyl ether, hexaethylene glycol butyl propyl ether, hexaethylene glycol propyl pentyl ether, hexaethylene glycol propyl hexyl ether, hexaethylene glycol propyl heptyl ether, and hexaethylene glycol propyl octyl ether;

hexaethylene glycol dibutyl ether, hexaethylene glycol butyl pentyl ether, hexaethylene glycol butyl hexyl ether, hexaethylene glycol butyl heptyl ether, and hexaethylene glycol butyl octyl ether;

hexaethylene glycol dipentyl ether, hexaethylene glycol hexyl pentyl ether, hexaethylene glycol heptyl pentyl ether, and hexaethylene glycol octyl pentyl ether;

hexaethylene glycol dihexyl ether, hexaethylene glycol heptyl hexyl ether, and hexaethylene glycol hexyl octyl ether;

hexaethylene glycol diheptyl ether and hexaethylene glycol heptyl octyl ether; and hexaethylene glycol dioctyl ether.

Similarly, the linear ether in the preferred mode may be a heptaethylene glycol-based ether, an octaethylene glycol-based ether, a nonaethylene glycol-based ether, a decaethylene glycol-based ether, or the like, and may further be a polyethylene glycol-based ether.

The cyclic ether is, for example, tetrahydrofuran. The dialkylsulfone is represented, for example, by the general formula:

$$R'—SO_2—R''$$

in the general formula, R' and R" each independently represent a hydrocarbon group having 1 to 4 carbon atoms, and may be the same or different from each other.

In one preferred mode of the dialkylsulfone, the hydrocarbon group having 1 to 4 carbon atoms is an aliphatic hydrocarbon group. That is, as for the dialkylsulfone contained in the electrolytic solution of the electrochemical device according to an embodiment, R' and R" in the general formula may each independently be a 1 to 4 aliphatic hydrocarbon group (a lower alkyl group having 1 to 4 carbon atoms). The dialkylsulfone is not particularly limited, and examples thereof include dimethylsulfone, methylethylsulfone, methyl-n-propylsulfone, methyl-i-propylsulfone, methyl-n-butylsulfone, methyl-i-butylsulfone, methyl-s-butylsulfone, methyl-t-butylsulfone, ethylmethylsulfone, diethylsulfone, ethyl-n-propylsulfone, ethyl-i-propylsulfone, ethyl-n-butylsulfone, ethyl-i-butylsulfone, ethyl-s-butylsulfone, ethyl-t-butylsulfone, di-n-propylsulfone, di-i-propylsulfone, n-propyl-n-butylsulfone, n-butylethylsulfone, i-butylethylsulfone, s-butylethylsulfone, and di-n-butylsulfone.

The magnesium electrode-based electrolytic solution contains a magnesium salt. The magnesium salt may be a single kind of magnesium salt, or may be composed of more than one kind of magnesium salt. The magnesium salt is preferably at least one magnesium salt selected from the group consisting of magnesium halide, magnesium perfluoroalkylsulfonylimide, and magnesium bishexaalkyldisilazide. Use of such a magnesium salt makes the magnesium electrode-based electrochemical device according to an embodiment easier to exhibits higher cycle characteristics and higher energy density.

Such a magnesium salt can be represented by the general formula $MgX_n$, wherein n is 1 or 2, and X is a monovalent or divalent anion. When X is halogen (more specifically, F, Cl, Br, and I), the magnesium salt forms a halogen metal salt (magnesium halide). Examples of the halogen metal salt include at least one selected from the group consisting of magnesium fluoride ($MgF_2$), magnesium chloride ($MgCl_2$), magnesium bromide ($MgBr_2$), and magnesium iodide ($MgI_2$). Among them, magnesium chloride is preferably used as a halogen metal salt. Magnesium chloride ($MgCl_2$), together with the "negative electrode in contact with the fullerene analogue-containing layer", can promote high cycle characteristics and high energy density of the electrochemical device.

When X has a disilazide structure represented by the general formula: $(R_3Si)_2N$ (in the general formula, R is a hydrocarbon group having 1 to 10 carbon atoms), the magnesium salt represented by the general formula: $MgX_n$, wherein n is 1 or 2, and X is a monovalent or divalent anion, forms a magnesium salt having a disilazide structure. In the general formula, R is preferably an aliphatic hydrocarbon group having 1 to 10 carbon atoms, and more preferably a lower alkyl group having 1 to 4 carbon atoms. Such a magnesium salt is preferably a magnesium salt of hexaalkyldisilazide (magnesium bishexaalkyldisilazide ($Mg(HRDS)_2$), provided that R is an alkyl group). The "magnesium salt" having such a disilazide structure, together with the "negative electrode in contact with the fullerene analogue-containing layer", can promote high cycle characteristics and energy density of the magnesium electrode-based electrochemical device.

When X has imide (preferably sulfonylimide) as a molecular structure, the magnesium salt represented by the general formula: $MgX_n$, wherein n is 1 or 2, and X is a monovalent or divalent anion, forms an imide metal salt. The imide metal salt is preferably a magnesium salt of perfluoroalkylsulfonylimide (magnesium perfluoroalkylsulfonylimide: $Mg((R_{f1}SO_2)_2N)_2$). In the general formula, $R_{f1}$ may be a perfluoroalkyl group having 1 to 10 carbon atoms, a perfluoroalkyl group having 1 to 8 carbon atoms, a perfluoroalkyl group having 1 to 6 carbon atoms, a perfluoroalkyl group having 1 to 4 carbon atoms, a perfluoroalkyl group having 1 to 3 carbon atoms, or a perfluoroalkyl group having 1 to 2 carbon atoms. Such an imide metal salt, together with the "negative electrode in contact with the fullerene analogue-containing layer", can promote high cycle characteristics and high energy density of the electrochemical device. As one example, the imide metal salt may be magnesium bis(trifluoromethanesulfonyl)imide, namely, $Mg(TFSI)_2$. Such $Mg(TFSI)_2$ easily achieves high cycle characteristics and high energy density in the electrochemical device according to an embodiment. In a preferred mode, $Mg(TFSI)_2$, together with the above-mentioned halogen metal salt (especially, magnesium chloride ($MgCl_2$)) and the "negative electrode in contact with the fullerene analogue-containing layer", can promote high cycle characteristics and high energy density of the magnesium electrode-based electrochemical device.

X may be another anion, and for example, X may be at least one magnesium salt selected from the group consisting of magnesium perchlorate ($Mg(ClO_4)_2$), magnesium nitrate ($Mg(NO_3)_2$), magnesium sulfate ($MgSO_4$), magnesium acetate ($Mg(CH_3COO)_2$), magnesium trifluoroacetate ($Mg(CF_3COO)_2$), magnesium tetrafluoroborate ($Mg(BF_4)_2$), magnesium tetraphenylborate ($Mg(B(C_6H_5)_4)_2$), magnesium hexafluorophosphate ($Mg(PF_6)_2$), magnesium hexafluoroarsenate ($Mg(AsF_6)_2$), and a magnesium salt of perfluoroalkylsulfonic acid ($(Mg(R_{f2}SO_3)_2$), provided that $R_{f2}$ is a perfluoroalkyl group).

In another preferred mode, the magnesium salt is a combination of two types of salts, a halogen metal salt and an imide metal salt. The halogen metal salt is, for example, magnesium chloride ($MgCl_2$), and the imide salt may be a magnesium salt of perfluoroalkylsulfonylimide, for example, $Mg(TFSI)_2$. $MgCl_2$ and $Mg(TFSI)_2$ are relatively highly stable Mg salts. Thus, also when $MgCl_2$ and $Mg(TFSI)_2$ are contained in a high concentration in the linear ether solvent, high safety can be obtained. This can be an advantage over conventional electrolytic solutions using $AlCl_3$ and Grignard. In addition, since $MgCl_2$ and $Mg(TFSI)_2$ have low reactivity, side reactions other than the electrochemical reaction with sulfur do not occur, and higher capacity can be expected. Moreover, since the overvoltage of precipitation and dissolution of magnesium is low, the charge/discharge hysteresis can be narrower than that in conventional reports, and in that respect as well, an increased energy density of the device can be expected. Furthermore, although a total Mg salt concentration can be made very high, high ionic conductivity and high rate characteristics can be expected, and since the freezing point is lowered and the boiling point is made higher, an electrochemical device with a wide temperature range can be provided.

When two types of salts such as a combination of a halogen metal salt and an imide metal salt are used as the magnesium salt, substance amounts of these salts may be about the same (in a specific example, they may be equimolar amounts). Although not particularly limited, taking a combination of $MgCl_2$ and $Mg(TFSI)_2$ as an example, the molar ratio of $MgCl_2$:$Mg(TFSI)_2$ may be about 1:0.3 to 1.7, for example, about 1:0.4 to 1.6 or 1:0.5 to 1.5, or may be about 1:0.7 to 1.3, for example, about 1:0.85 to 1.25 depending on the type of the linear ether.

In the electrochemical device according to an embodiment, the electrolytic solution may further contain a fullerene analogue as an additive. In such a case, the amount of the fullerene analogue to be added to the electrolytic solution containing a solvent and a magnesium salt contained in the solvent is preferably small. In this regard, the content of the fullerene analogue in the electrolytic solution (based on the entire electrolytic solution) may be smaller than the content of the magnesium salt in the electrolytic solution (based on the entire electrolytic solution). In a preferred mode, the content of the fullerene analogue in the electrolytic solution (the amount of the fullerene analogue relative to the total amount of the electrolytic solution) is ½ or less, ⅕ or less, or 1/10 or less of the content of the magnesium salt in the electrolytic solution (the amount of the magnesium salt relative to the total amount of the electrolytic solution).

In other words, the molar concentration of the fullerene analogue based on the electrolytic solution may be smaller than the content of the magnesium salt based on the electrolytic solution. As mere examples, the content of the fullerene analogue in the electrolytic solution may correspond to an extremely small addition amount, such as 0.5 M or less (based on the entire electrolytic solution), 0.1 M or less (based on the entire electrolytic solution), 0.05 M or less (based on the entire electrolytic solution), or 0.01 M or less (based on the entire electrolytic solution). In an embodiment, also with such a small content, the effect of further improving the cycle characteristics and the energy density of the magnesium electrode-based electrochemical device can be exhibited.

The electrolytic solution according to an embodiment is a so-called "magnesium electrode-based" electrolytic solution. It can be said that it is an extremely useful effect that especially the cycle characteristics are further improved by adding the "fullerene analogue" despite such a magnesium electrode-based electrolytic solution. This is because it was generally considered difficult to improve the cycle characteristics with additives because it was assumed that the Mg coordination structure was very fragile. That is, in an embodiment, although the device is a "magnesium electrode-based" electrochemical device, the cycle characteristics and the energy density are improved, so that the use of a battery more suitable for use in an actual environment can be achieved.

The electrochemical device can include an electrolyte layer constituted of the above-described electrolytic solution and a polymer compound composed of a retainer that holds the electrolytic solution.

The polymer compound may be swollen by the electrolytic solution. In this case, the polymer compound swollen by the electrolytic solution may be in a gel state. Examples of the polymer compound include polyacrylonitrile, polyvinylidene fluoride, a copolymer of vinylidene fluoride and hexafluoropropylene, polytetrafluoroethylene, polyhexafluoropropylene, polyethylene oxide, polypropylene oxide, polyphosphazene, polysiloxane, polyvinyl acetate, polyvinyl alcohol, polymethyl methacrylate, polyacrylic acid, polymethacrylic acid, styrene-butadiene rubber, nitrile-butadiene rubber, polystyrene and/or polycarbonate. In particular, if further importance is attached to the viewpoint of electrochemical stability, the polymer compound may be polyacrylonitrile, polyvinylidene fluoride, polyhexafluoropropylene, or polyethylene oxide. The electrolyte layer may be a solid electrolyte layer.

The magnesium electrode-based electrochemical device can be configured as a secondary battery, and a conceptual diagram in that case is shown in FIG. 1. As shown in the diagram, during charging, magnesium ions ($Mg^{2+}$) move from a positive electrode 10 to a negative electrode 11 through an electrolyte layer 12, and thus electric energy is converted into chemical energy and electricity is stored. During discharging, magnesium ions return from the negative electrode 11 to the positive electrode 10 through the electrolyte layer 12 to generate electric energy.

When the electrochemical device is a battery (primary battery or secondary battery) composed of the above-described electrolytic solution, such a battery can be used as a driving power source or an auxiliary power source of, for example, a notebook type personal computer, a personal digital assistant (PDA), a mobile phone, a smart phone, a master unit and a slave unit of cordless phone, a video movie, a digital still camera, an electronic book, an electronic dictionary, a portable music player, a radio, a headphone, a game machine, a navigation system, a memory card, a cardiac pacemaker, a hearing aid, an electric tool, an electric shaver, a refrigerator, an air conditioner, a television receiver, a stereo, a water heater, a microwave oven, a dishwasher, a washing machine, a dryer, a lighting apparatus, a toy, a medical device, a robot, a road conditioner, a traffic light, a railway vehicle, a golf cart, an electric cart, and/or an electric car (including a hybrid car). In addition, the battery can be mounted on a building such as a house, a power source for power storage that is used for power generation facilities, or the like, or can be used in order to supply electric power thereto. In an electric car, a conversion device that converts electric power into a driving force by supplying electric power is generally a motor. Examples of the control device (control unit) that processes information related to vehicle control includes a control device that displays the remaining battery level based on information on the remaining battery level. The battery can also be used in an electric storage device in a so-called smart grid. Such a power storage device can not only supply electric power but also store electric power by receiving electric power supply from other power source. As the "other power source", thermal power generation, nuclear power generation, hydroelectric power generation, a solar battery, wind power generation, geothermal power generation, and/or a fuel cell (including a biofuel cell) can be used.

The electrochemical device according to an embodiment (that is, the secondary battery) is applicable to a battery pack including a secondary battery, control means (or a control unit) that performs control involving the secondary battery, and an exterior enclosing the secondary battery. In the battery pack, the control means can control, for example, charge/discharge, overdischarge or overcharge of the secondary battery.

The electrochemical device (that is, a secondary battery) can also be applied to an electronic device that receives electric power from a secondary battery.

The electrochemical device can also be applied to a secondary battery in an electric vehicle including a conversion device for converting electric power supplied from the secondary battery into a driving force of the vehicle and a control device (or a control unit) for performing information processing related to vehicle control based on information on the secondary battery. In such an electric vehicle, the conversion device typically receives electric power from the secondary battery, drives a motor, and generates a driving force. The motor can be driven also by utilizing regenerative energy. The control device (or control unit) performs information processing related to vehicle control based on, for example, the remaining battery level of the secondary battery. Examples of such an electric vehicle include an electric car, an electric motorcycle, an electric bicycle, and a railway vehicle, and also a so-called hybrid vehicle.

The electrochemical device (that is, secondary battery) can be applied to a power system configured to receive the supply of electric power from a secondary battery and/or supply the electric power from a power source to the secondary battery. Such a power system may be any power system as long as the power system uses electric power, and includes a mere power device. Such power systems include, for example, smart grids, household energy management systems (HEMS), and/or vehicles, and can also store electricity.

The electrochemical device (that is, secondary battery) can be applied to a power source for power storage configured to have a secondary battery and be connected to an electronic device to which electric power is supplied. This power source for power storage can be basically used for any power system or power device regardless of the application of the power source for power storage, and can be used for a smart grid, for example.

Other matters such as more detailed matters and more specific modes of the electrochemical device according to an embodiment are described above, and the description is omitted to avoid duplication.

Here, a case where the magnesium electrode-based electrochemical device according to an embodiment is provided as a secondary battery will be described in more detail. Hereinafter, such a secondary battery is also referred to as a "magnesium secondary battery".

The magnesium secondary battery as the electrochemical device can be applied, without any particular limitation, to a machine, a device, a tool, an apparatus, and a system (an assembly of a plurality of devices or the like) which can be used as a power source for driving/operating the secondary battery or a power storage source for accumulating electric power. The magnesium secondary battery to be used as a power source (e.g., a magnesium-sulfur secondary battery) may be either a main power source (a power source to be used preferentially) or an auxiliary power source (a power source to be used instead of the main power source or a power source to be used by switching from the main power source). When a magnesium secondary battery is used as an auxiliary power source, the main power source is not limited to a magnesium secondary battery.

Specific examples of an application of the magnesium secondary battery (particularly, magnesium-sulfur secondary battery) include various electronic devices and electric devices (including portable electronic devices) such as a video camera, a camcorder, a digital still camera, a mobile phone, a personal computer, a television receiver, various display devices, a cordless phone, a headphone stereo, a music player, a portable radio, electronic paper such as an electronic book and/or an electronic newspaper, or a portable information terminal including PDA; a toy; a portable living appliance such as an electric shaver; a lighting appliance such as an interior light; a medical electronic device such as a pacemaker and/or a hearing aid; a storage device such as a memory card; a battery pack used as a detachable power source for a personal computer or the like; an electric tool such as an electric drill and/or an electric saw; a power storage system and/or a home energy server (household power storage device) such as a household battery system for accumulating electric power in preparation for emergency or the like and a power supply system; a power storage unit and/or a backup power source; an electric vehicle such as an electric car, an electric motorcycle, an electric bicycle, and/or Segway (registered trademark); and a power driving force conversion device of an airplane and/or a ship (specifically, for example, a power motor), but are not limited to these applications.

Above all, the magnesium secondary battery (particularly, the magnesium-sulfur secondary battery) is effectively applied to, for example, a battery pack, an electric vehicle, a power storage system, a power supply system, an electric tool, an electronic device, and/or an electric device. The battery pack is a power source using a magnesium secondary battery, and is a so-called assembled battery or the like. The electric vehicle is a vehicle that operates (for example, travels) using a magnesium secondary battery as a driving power source, and may be an automobile also including a driving source other than the secondary battery (for example, a hybrid car). The power storage system (for example, a power supply system) is a system using a magnesium secondary battery as a power storage source. For example, in a home power storage system (power supply system), electric power is stored in a magnesium secondary battery as a power storage source, and thus home electric appliances and the like can be used using electric power. The electric tool is a tool in which a movable portion (for example, a drill) moves using the magnesium secondary battery as a driving power source. The electronic device and the electric device are devices that exhibit various functions using a magnesium secondary battery as a power source (that is, power supply source) for operation.

Hereinafter, a cylindrical magnesium secondary battery and a flat plate type laminated film type magnesium secondary battery will be described.

Figure 2:
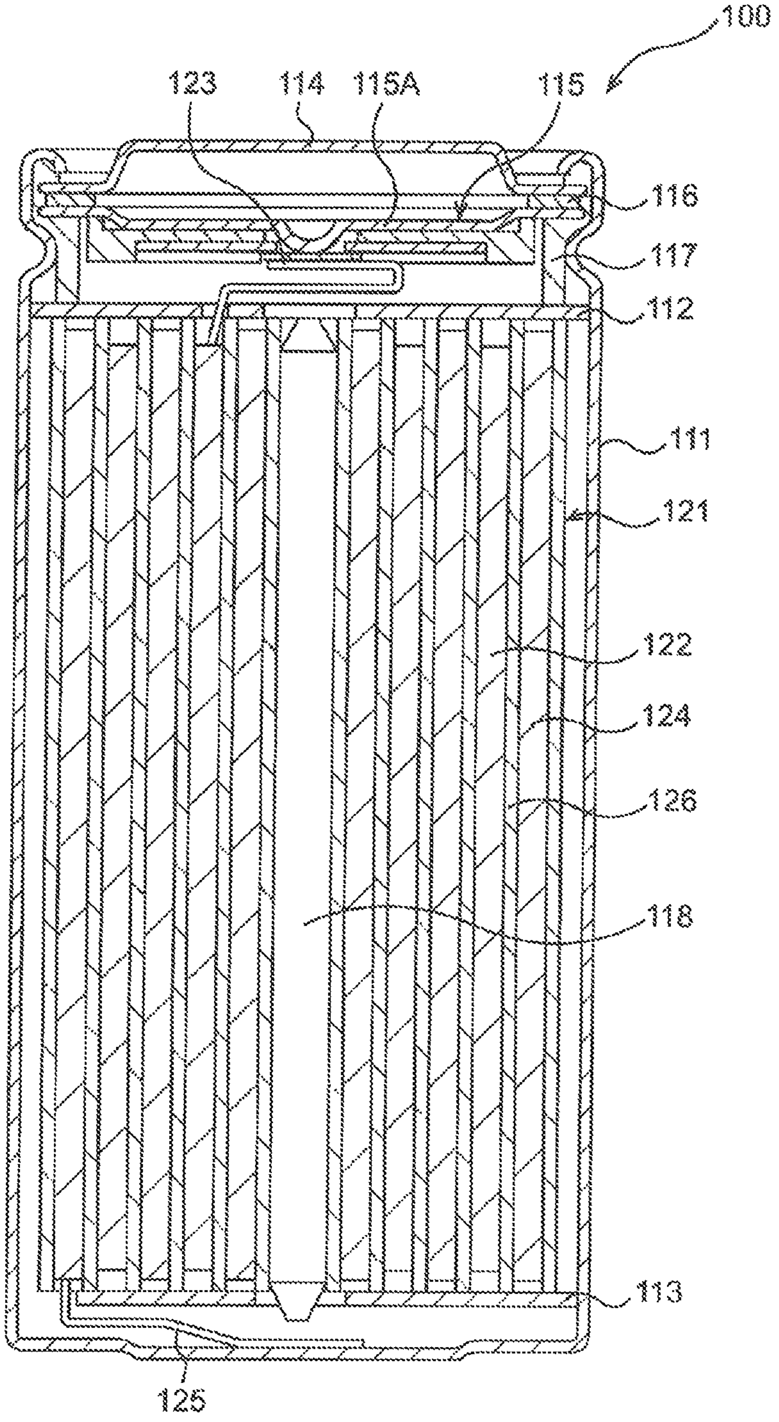
FIG. 2 is a schematic sectional view of a magnesium secondary battery (cylindrical magnesium secondary battery) provided as an embodiment of the present application.

FIG. 2 shows a schematic sectional view of a cylindrical magnesium secondary battery 100. In the magnesium secondary battery 100, an electrode structure 121 and a pair of insulating plates 112,113 are housed in a substantially hollow cylindrical electrode structure housing member 111. The electrode structure 121 can be produced, for example, by stacking a positive electrode 122 and a negative electrode 124 with a separator 126 interposed therebetween to obtain an electrode structure and then winding the electrode structure. The electrode structure housing member (for example, a battery can) 111 has a hollow structure in which one end is closed and the other end is open, and includes iron (Fe) and/or aluminum (Al). The pair of insulating plates 112,113 is disposed so as to sandwich the electrode structure 121 and extend perpendicularly to the winding peripheral surface of the electrode structure 121. A battery lid 114, a safety valve mechanism 115, and a positive temperature coefficient element (for example, PTC element) 116 are crimped to the open end of the electrode structure housing member 111 with a gasket 117 interposed therebetween, and the electrode structure housing member 111 is thereby sealed. The battery lid 114 includes, for example, the same material as that of the electrode structure housing member 111. The safety valve mechanism 115 and the positive temperature coefficient element 116 are provided inside the battery lid 114, and the safety valve mechanism 115 is electrically connected to the battery lid 114 with the positive temperature coefficient element 116 interposed therebetween. In the safety valve mechanism 115, a disk plate 115A is reversed when the internal pressure becomes equal to or higher than a certain level due to internal short circuit and/or external heating. As a result, the electrical connection between the battery lid 114 and the electrode structure 121 is disconnected. In order to prevent abnormal heat generation due to a large amount of current, the resistance of the positive temperature coefficient element 116 increases as the temperature rises. The gasket 117 is includes, for example, an insulating material. The surface of the gasket 117 may be coated with asphalt or the like.

A center pin 118 is inserted into the winding center of the electrode structure 121. However, the center pin 118 may not be inserted into the winding center. A positive electrode lead portion 123 including a conductive material such as aluminum is connected to the positive electrode 122. Specifically, the positive electrode lead portion 123 is attached to a positive electrode current collector. A negative electrode lead portion 125 including a conductive material such as copper is connected to the negative electrode 124. Specifically, the negative electrode lead portion 125 is attached to a negative electrode current collector. The negative electrode lead portion 125 is welded to the electrode structure housing member 111 and is electrically connected to the electrode structure housing member 111. The positive electrode lead portion 123 is welded to the safety valve mechanism 115 and is electrically connected to the battery lid 114. In the example shown in FIG. 2, the negative electrode lead portion 125 is disposed at one place (the outermost peripheral portion of the wound electrode structure), but may be disposed at two places (the outermost peripheral portion and the innermost peripheral portion of the wound electrode structure).

The electrode structure 121 is formed of the positive electrode 122 and the negative electrode 124 laminated with the separator 126 interposed therebetween, the positive electrode 122 having positive electrode active material layers formed on the positive electrode current collector (more specifically, on both sides of the positive electrode current collector), the separator 126 having negative electrode active material layers formed on the negative electrode current collector(more specifically, on both sides of a negative electrode current collector). The positive electrode active material layer is not formed in a region of the positive electrode current collector to which the positive electrode lead portion 123 is attached, and the negative electrode active material layer is not formed in a region of the negative electrode current collector to which the negative electrode lead portion 125 is attached.

The magnesium secondary battery 100 can be manufactured, for example, based on the following procedure.

First, positive electrode active material layers are formed on both surfaces of the positive electrode current collector, and negative electrode active material layers are formed on both surfaces of the negative electrode current collector.

Subsequently, the positive electrode lead portion 123 is attached to the positive electrode current collector by a welding method or the like. In addition, the negative electrode lead portion 125 is attached to the negative electrode current collector by a welding method or the like. Subsequently, the positive electrode 122 and the negative electrode 124 are stacked with a separator 126 including a microporous polyethylene film interposed therebetween, and are wound (more specifically, the electrode structure (that is, stacked structure) of the positive electrode 122/separator 126/negative electrode 124/separator 126 is wound) to manufacture the electrode structure 121. Thereafter, a protective tape (not shown) is adhered to an outermost peripheral portion. Thereafter, the center pin 118 is inserted into a center of the electrode structure 121. Subsequently, the electrode structure 121 is housed inside the electrode structure housing member 111 while the electrode structure 121 is sandwiched between the pair of insulating plates 112,113. In this case, a tip of the positive electrode lead portion 123 is attached to the safety valve mechanism 115, and a tip of the negative electrode lead portion 125 is attached to the electrode structure housing member 111 using a welding method or the like. Thereafter, an electrolytic solution is injected based on a decompression method, and the separator 126 is impregnated with the electrolytic solution. Subsequently, the battery lid 114, the safety valve mechanism 115, and the positive temperature coefficient element 116 are crimped to an opening end of the electrode structure housing member 111 with the gasket 117 interposed therebetween.

Figure 3:
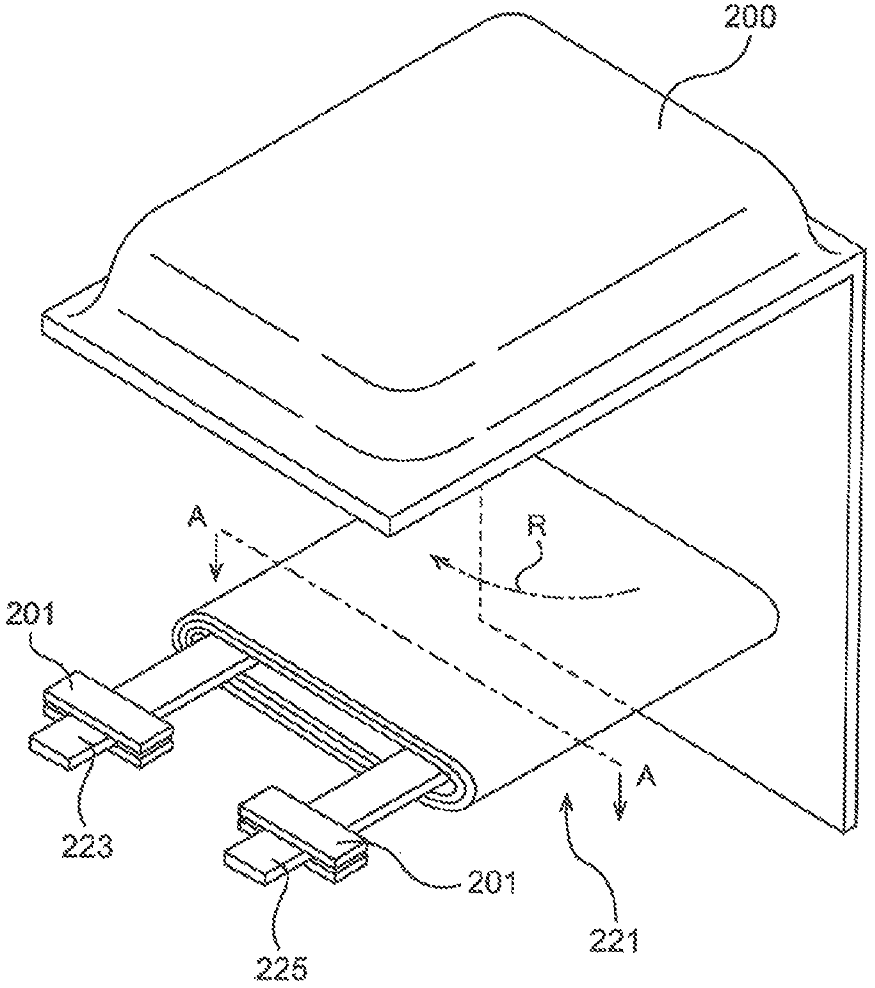
FIG. 3 is a schematic perspective view of a magnesium secondary battery (flat plate type laminated film type magnesium secondary battery) provided as an embodiment of the present application.

Next, a flat plate type laminated film type secondary battery will be described. FIG. 3 shows a schematic exploded perspective view of such a secondary battery. In this secondary battery, an electrode structure 221 basically similar to that described above is housed inside an exterior member 200 including a laminated film. The electrode structure 221 can be manufactured by stacking a positive electrode and a negative electrode with a separator and an electrolyte layer interposed therebetween, and then winding this stacked structure. A positive electrode lead portion 223 is attached to the positive electrode, and a negative electrode lead portion 225 is attached to the negative electrode. The outermost peripheral portion of the electrode structure 221 is protected by a protective tape. The positive electrode lead portion 223 and the negative electrode lead portion 225 protrude in the same direction from the inside to the outside of the exterior member 200. The positive electrode lead portion 223 includes a conductive material such as aluminum. The negative electrode lead portion 225 includes a conductive material such as copper, nickel, and/or stainless steel.

The exterior member 200 is a single film foldable in the direction of the arrow R illustrated in FIG. 3, and a recess (for example, emboss) for housing the electrode structure 221 is provided in a part of the exterior member 200. The exterior member 200 is, for example, a laminate film in which a fusion layer, a metal layer, and a surface protective layer are stacked in this order. In a step of manufacturing the secondary battery, the exterior member 200 is folded such that the fusion layers face each other with the electrode structure 221 interposed therebetween, and then the outer peripheral edges of the fusion layers are fused to each other. However, the exterior member 200 may be formed by bonding two separate laminate films to each other with an adhesive or the like interposed therebetween. The fusion layer includes, for example, a film of polyethylene and/or polypropylene. The metal layer includes, for example, an aluminum foil or the like. The surface protective layer includes, for example, nylon and/or polyethylene terephthalate. In particular, the exterior member 200 is preferably an aluminum laminate film in which a polyethylene film, an aluminum foil, and a nylon film are stacked in this order. However, the exterior member 200 may be a laminate film having another laminated structure, a polymer film such as polypropylene, or a metal film. Specifically, the exterior member 200 may include a moisture-resistant aluminum laminate film in which a nylon film, an aluminum foil, and an unstretched polypropylene film are stacked in this order from the outside.

In order to prevent entry of outside air, a close contact film 201 is inserted between the exterior member 200 and the positive electrode lead portion 223 and between the exterior member 200 and the negative electrode lead portion 225. The close contact film 201 may include a material having a close contact property to the positive electrode lead portion 223 and the negative electrode lead portion 225, for example, a polyolefin resin, and more specifically, may include a polyolefin resin such as polyethylene, polypropylene, modified polyethylene, or modified polypropylene.

Although the above description has focused primarily on secondary batteries, the present disclosure also applies to other electrochemical devices such as capacitors, air batteries, and fuel cells. This will be described below.

Figure 4:
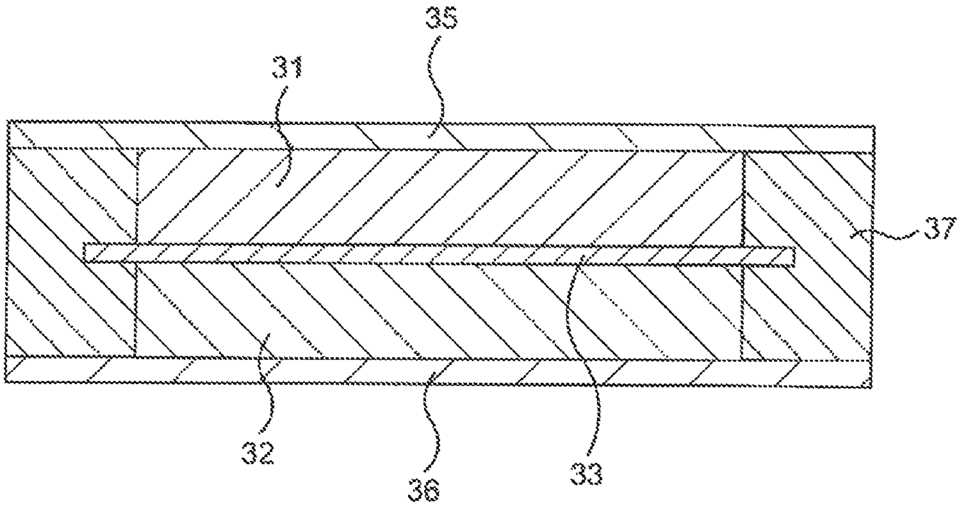
FIG. 4 is a schematic sectional view of an electrochemical device provided as a capacitor in an embodiment of the present application.

The electrochemical device can be provided as a capacitor as shown in the schematic sectional view of FIG. 4. In the capacitor, a positive electrode 31 and a negative electrode 32 are disposed to face each other with a separator 33 impregnated with the electrolytic solution interposed therebetween. A gel electrolyte membrane impregnated with the electrolytic solution may be disposed on a surface of at least one of the separator 33, the positive electrode 31, and the negative electrode 32. Reference numerals 35 and 36 denote current collectors, and reference numeral 37 denotes a gasket.

Figure 5:
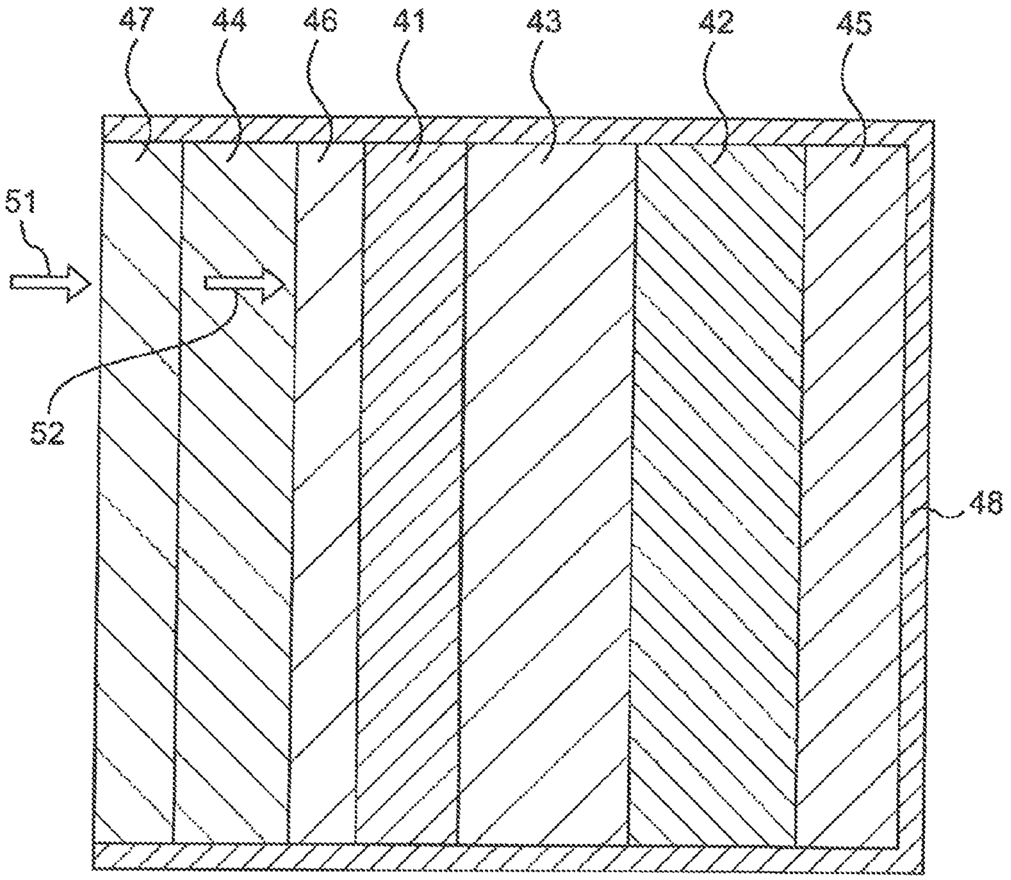
FIG. 5 is a schematic sectional view of an electrochemical device provided as an air battery in an embodiment of the present application.

Alternatively, the electrochemical device can also be provided as an air battery as shown in the conceptual diagram of FIG. 5. Such an air battery is constituted of, for example, an oxygen-selective permeable film 47 through which water vapor hardly permeates and oxygen can permeate selectively, an air electrode side current collector 44 including a conductive porous material, a porous diffusion layer 46 disposed between the air electrode side current collector 44 and a porous positive electrode 41 and including a conductive material, the porous positive electrode 41 including a conductive material and a catalyst material, a separator through which water vapor hardly permeates and an electrolytic solution (or a solid electrolyte containing an electrolytic solution) 43, a negative electrode 42 which releases magnesium ions, a negative electrode side current collector 45, and an exterior body 48 in which these layers are housed.

Oxygen 52 in air (for example, atmosphere) 51 is selectively allowed to permeate the oxygen-selective permeable film 47, passes through the air electrode side current collector 44 including the porous material, is diffused by the diffusion layer 46, and is supplied to the porous positive electrode 41. The travel of the oxygen that has permeated through the oxygen-selective permeable film 47 is blocked in part by the air electrode side current collector 44, but since the oxygen that has passed through the air electrode side current collector 44 is diffused and spread by the diffusion layer 46, the oxygen efficiently spreads over the entire porous positive electrode 41, and the supply of oxygen to the entire surface of the porous positive electrode 41 is not inhibited by the air electrode side current collector 44. In addition, since the permeation of water vapor is controlled by the oxygen-selective permeable film 47, deterioration due to the influence of moisture in the air is small, and oxygen is efficiently supplied to the entire porous positive electrode 41, so that the battery output can be increased and the battery can be stably used for a long period.

Figure 6:
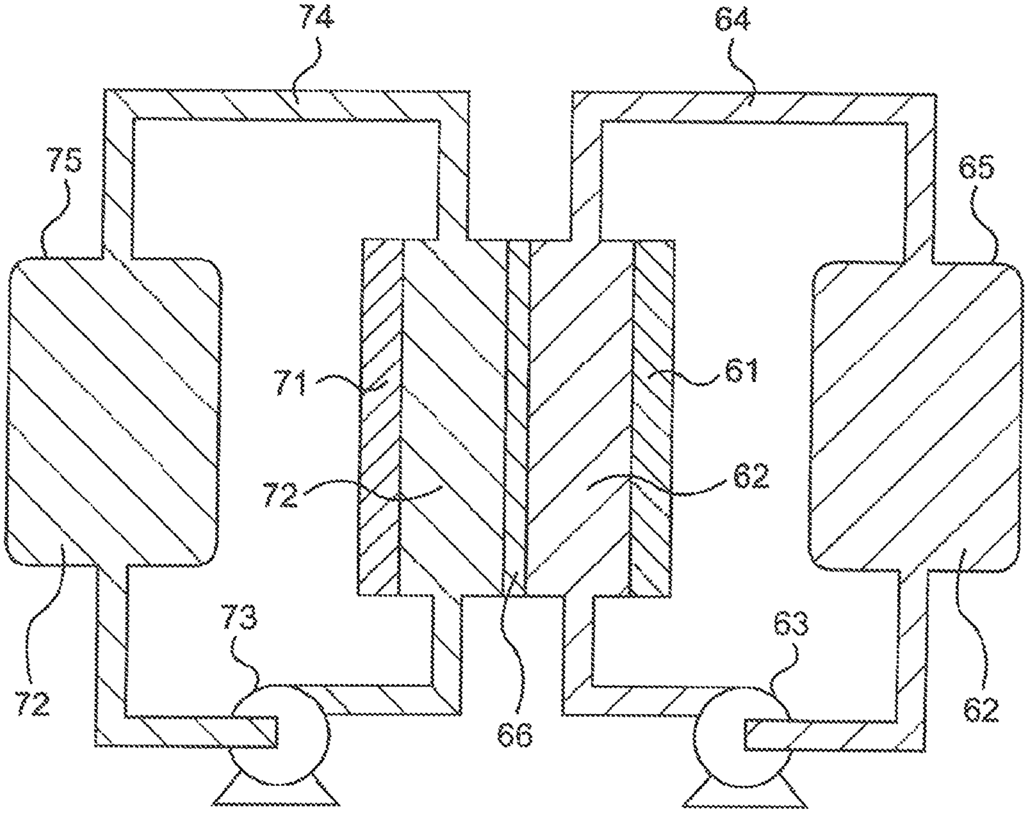
FIG. 6 is a schematic sectional view of an electrochemical device provided as a fuel cell in an embodiment of the present application.

Alternatively, the electrochemical device can also be provided as a fuel cell as shown in the conceptual diagram of FIG. 6. The fuel cell is constituted of, for example, a positive electrode 61, a positive electrode electrolytic solution 62, a positive electrode electrolytic solution transport pump 63, a fuel flow path 64, a positive electrode electrolytic solution storage container 65, a negative electrode 71, a negative electrode electrolytic solution 72, a negative electrode electrolytic solution transport pump 73, a fuel flow path 74, a negative electrode electrolytic solution storage container 75, and an ion exchange membrane 66. In the fuel flow path 64, the positive electrode electrolytic solution 62 continuously or intermittently flows (circulates) through the positive electrode electrolytic solution storage container 65 and the positive electrode electrolytic solution transport pump 63. In the fuel flow path 74, the negative electrode electrolytic solution 72 continuously or intermittently flows (circulates) through the negative electrode electrolytic solution storage container 75 and the negative electrode electrolytic solution transport pump 73. Power is generated between the positive electrode 61 and the negative electrode 71. As the positive electrode electrolytic solution 62, a solution obtained by adding a positive electrode active material to the electrolytic solution according to an embodiment can be used, and as the negative electrode electrolytic solution 72, a solution obtained by adding a negative electrode active material to the electrolytic solution can be used.

As for the negative electrode in the electrochemical device, a Mg metal plate can be used, and the negative electrode can also be produced by the following method. For example, a Mg plating layer may be formed on a Cu foil as a negative electrode active material layer by preparing a Mg electrolytic solution (Mg-EnPS) containing $MgCl_2$ and EnPS (ethyl-n-propylsulfone), and depositing Mg metal on a Cu foil based on an electrolytic plating method using the Mg electrolytic solution. Incidentally, as a result of the analysis based on the XPS method of a surface of the Mg plating layer obtained by such a method, it was clarified that Mg, C, O, S and Cl were present on the surface of the Mg plating layer, a Mg-derived peak observed by surface analysis was not split, and a single peak derived from Mg was observed in the range of 40 eV or more and 60 eV or less. Furthermore, the surface of the Mg plating layer was dug by about 200 nm in the depth direction on the basis of the Ar sputtering method, and the surface was analyzed on the basis of the XPS method. As a result, it was found that the position and shape of the Mg-derived peak after the Ar sputtering did not change as compared with the position and shape of the peak before the Ar sputtering.

The electrochemical device according to an embodiment can be particularly suitably used as a magnesium secondary battery as described with reference to FIGS. 1 to 3, and some application examples of the magnesium secondary battery will be described more specifically. It is noted that the configuration of each application example described below is merely an example and the configuration can be appropriately changed.

The magnesium secondary battery can be used in the form of a battery pack. Such a battery pack is a simple battery pack (so-called soft pack) using a magnesium secondary battery, and is mounted on, for example, an electronic device typified by a smartphone. Alternatively or additionally, the battery pack may include an assembled battery including six magnesium secondary batteries connected in 2 parallel and 3 series. The connection type of the magnesium secondary batteries may be in series, in parallel, or a combination of both.

Figure 7:
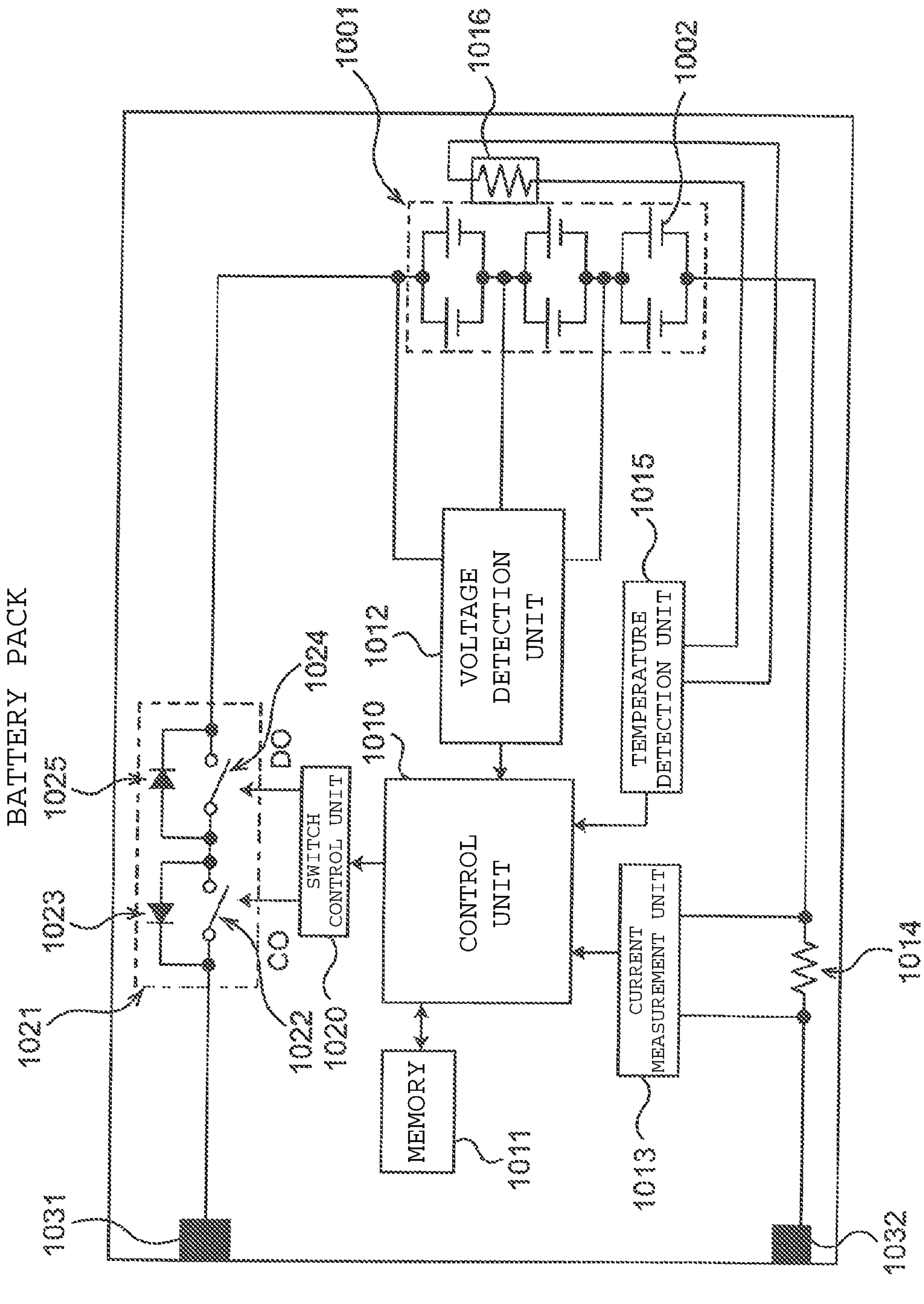
FIG. 7 is a block diagram showing a circuit configuration example in a case where a magnesium secondary battery provided as an embodiment of the present application is applied to a battery pack.

FIG. 7 shows a block diagram showing a circuit configuration example in a case where the magnesium secondary battery according to an embodiment is applied to a battery pack. The battery pack includes a cell (for example, assembled battery) 1001, an exterior member, a switch unit 1021, a current detection resistor 1014, a temperature detection element 1016, and a control unit 1010. The switch unit 1021 includes a charge control switch 1022 and a discharge control switch 1024. The battery pack includes a positive electrode terminal 1031 and a negative electrode terminal 1032, and during charge, the positive electrode terminal 1031 and the negative electrode terminal 1032 are connected to a positive electrode terminal and a negative electrode terminal of a charger, respectively and the charge is carried out. When an electronic device is used, the positive electrode terminal 1031 and the negative electrode terminal 1032 are connected to a positive electrode terminal and a negative electrode terminal of the electronic device, respectively and discharge is carried out.

The cell 1001 is configured by connecting a plurality of magnesium secondary batteries 1002 in the present disclosure in series and/or in parallel. Although FIG. 7 shows a case where six magnesium secondary batteries 1002 are connected in 2 parallel and 3 series (2P3S), any other connection manner such as p parallel q series (where p and q are integers) may be employed.

The switch unit 1021 includes a charge control switch 1022 and a diode 1023 as well as a discharge control switch 1024 and a diode 1025, and is controlled by the control unit 1010. The diode 1023 has a backward polarity with respect to a charge current flowing in a direction from the positive electrode terminal 1031 toward the cell 1001, and a forward polarity with respect to a discharge current flowing in a direction from the negative electrode terminal 1032 toward the cell 1001. The diode 1025 has a forward polarity with respect to the charge current and a backward polarity with respect to the discharge current. In the example, the switch unit is provided on the plus (+) side, but may be provided on the minus (−) side. The control unit 1010 controls the charge control switch 1022 such that the charge control switch 1022 is closed when the battery voltage has reached the overcharge detection voltage, and no charge current flows in the current path of the cell 1001. After the charge control switch 1022 is closed, only discharge can be performed through the diode 1023. In addition, the control unit 1010 controls the charge control switch 1022 such that the charge control switch 1022 is closed in a case where a large amount of current flows during charge, and a charge current flowing in a current path of the cell 1001 is cut off. The control unit 1010 controls the discharge control switch 1024 such that the discharge control switch 1024 is closed when the battery voltage has reached the overdischarge detection voltage, and no discharge current flows in the current path of the cell 1001. After the discharge control switch 1024 is closed, only charge can be performed through the diode 1025. In addition, the control unit 1010 controls the discharge control switch 1024 such that the discharge control switch 1024 is closed in a case where a large amount of current flows during discharge, and a discharge current flowing in a current path of the cell 1001 is cut off.

The temperature detection element 1016 includes, for example, a thermistor and is provided in the vicinity of the cell 1001, and the temperature measurement unit 1015 measures the temperature of the cell 1001 using the temperature detection element 1016 and sends the measurement result to the control unit 1010. A voltage measurement unit 1012 measures the voltage of the cell 1001 and the voltage of each of the magnesium secondary batteries 1002 constituting the cell 1001, A/D converts the measurement results, and sends the converted result to the control unit 1010. A current measurement unit 1013 measures a current using the current detection resistor 1014, and sends the measurement result to the control unit 1010.

A switch control unit 1020 controls the charge control switch 1022 and the discharge control switch 1024 of the switch unit 1021 on the basis of a voltage and a current sent from the voltage measurement unit 1012 and the current measurement unit 1013. When a voltage of any one of the magnesium secondary batteries 1002 becomes equal to or lower than the overcharge detection voltage or overdischarge detection voltage and/or when a large amount of current rapidly flows, the switch control unit 1020 sends a control signal to the switch unit 1021 and prevents overcharge, overdischarge, and overcurrent charge/discharge. The charge control switch 1022 and the discharge control switch 1024 each can be constituted of, for example, a semiconductor switch such as MOSFET. In this case, the diodes 1023 and 1025 are each constituted of a parasitic diode of MOSFET. In a case where a p-channel FET is used as a MOSFET, the switch control unit 1020 supplies a control signal DO and a control signal CO to the gates of the charge control switch 1022 and the discharge control switch 1024, respectively. The charge control switch 1022 and the discharge control switch 1024 become conductive due to a gate potential lower than the source potential by a prescribed value or more. That is, in normal charge and discharge operations, the control signals CO and DO are set at low levels, and the charge control switch 1022 and the discharge control switch 1024 are kept conductive. In addition, for example, at the time of overcharge or overdischarge, the control signals CO and DO are set at high levels, and the charge control switch 1022 and the discharge control switch 1024 are closed.

A memory 1011 includes, for example, an erasable programmable read only memory (EPROM), which is a non-volatile memory. The memory 1011 stores in advance a numerical value calculated by the control unit 1010 and/or an internal resistance value and the like of each of the magnesium secondary batteries 1002 in the initial state measured at the stage of the manufacturing process, and these values can be rewritten as appropriate. In addition, by storing the full charge capacitance of the magnesium secondary battery 1002, the memory 1011 can calculate, for example, a remaining capacity together with the control unit 1010.

The temperature measurement unit 1015 measures temperature using the temperature detection element 1016, perform charge/discharge control at the time of abnormal heat generation, and performs correction in calculation of the remaining capacity.

Figure 8:
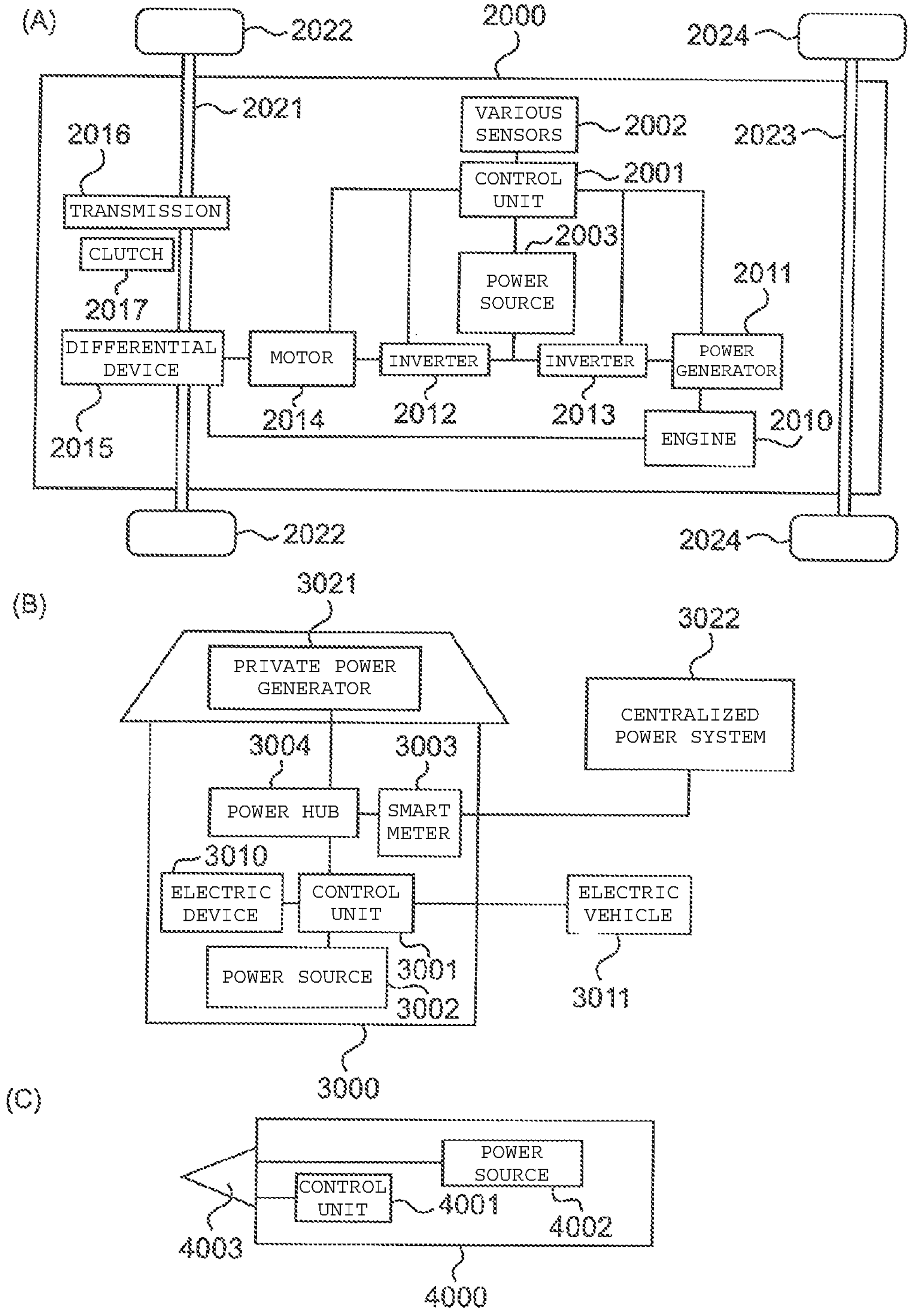
FIG. 8 includes views A to C, which are block diagrams illustrating the configurations of an electric vehicle, a power storage system, and an electric tool to which a magnesium secondary battery is applied as an embodiment of the present application.

Next, the application of the magnesium secondary battery to an electric vehicle will be described. FIG. 8A shows a block diagram showing a configuration of an electric vehicle such as a hybrid car, which is one example of the electric vehicle. The electric vehicle includes, for example, a control unit 2001, various sensors 2002, a power source 2003, an engine 2010, a power generator 2011, inverters 2012, 2013, a driving motor 2014, a differential device 2015, a transmission 2016, and a clutch 2017 in a metal housing 2000. In addition, the electric vehicle includes, for example, a front wheel drive shaft 2021, front wheels 2022, a rear wheel drive shaft 2023, and rear wheels 2024 connected to the differential device 2015 and/or the transmission 2016.

The electric vehicle can travel, for example, using either the engine 2010 or the motor 2014 as a drive source. The engine 2010 is a main power source and is, for example, a gasoline engine. In a case where the engine 2010 is used as a power source, a driving force (for example, rotational force) of the engine 2010 is transmitted to, for example, the front wheels 2022 or the rear wheels 2024 through, for example, the differential device 2015, the transmission 2016, and the clutch 2017, which are drive units. The rotational force of the engine 2010 is also transmitted to the power generator 2011, the power generator 2011 generates AC power using the rotational force, the AC power is converted into DC power via the inverter 2013, and the DC power is accumulated in the power source 2003. On the other hand, in the case in which the motor 2014, which is a conversion unit, is used as the power source, the electric power (for example, DC power) supplied from the power source 2003 is converted into AC power via the inverter 2012, and the motor 2014 is driven using the AC power. The driving force (for example, rotational force) converted from the electric power by the motor 2014 is transmitted to the front wheels 2022 or the rear wheels 2024, for example, through the differential device 2015, the transmission 2016, and the clutch 2017, which are drive units.

It is also permissible that when the electric vehicle is decelerated via a braking mechanism (not shown), the resistance force generated during the deceleration is transmitted to the motor 2014 as a rotational force, and the motor 2014 generates AC power utilizing the rotational force. The AC power is converted into DC power through the inverter 2012, and the DC regenerative power is accumulated in the power source 2003.

The control unit 2001 is a unit that controls the operation of the entire electric vehicle, and includes a CPU, for example. The power source 2003 can include one or two or more magnesium secondary batteries (not shown). The power source 2003 also may be configured to be connected to an external power supply and accumulate electric power by receiving power supply from the external power source. The various sensors 2002 are used, for example, to control the rotation speed of the engine 2010 and to control the opening degree (throttle opening degree) of a throttle valve (not shown). The various sensors 2002 include, for example, a speed sensor, an acceleration sensor, and/or an engine speed sensor.

Although the case where the electric vehicle is a hybrid car has been described, the electric vehicle may be a vehicle that operates only using the power source 2003 and the motor 2014 without using the engine 2010 (for example, an electric car).

Next, application of the magnesium secondary battery to a power storage system (for example, power supply system) will be described. FIG. 8B shows a block diagram showing a configuration of a power storage system (for example, power supply system). The power storage system includes, for example, a control unit 3001, a power source 3002, a smart meter 3003, and a power hub 3004 inside a house 3000 such as a general house or a commercial building.

For example, the power source 3002 is connected to an electric device (for example, electronic device) 3010 installed in the house 3000 and can be connected to an electric vehicle 3011 which parks outside the house 3000. Furthermore, for example, the power source 3002 is connected to a private power generator 3021 installed in the house 3000 with a power hub 3004 interposed therebetween, and can be connected to an external centralized power system 3022 via the smart meter 3003 and the power hub 3004. The electric device (for example, electronic device) 3010 includes, for example, one or more home electric appliances. Examples of the home electric appliance include a refrigerator, an air conditioner, a television receiver, and/or a water heater. The private power generator 3021 includes, for example, a solar power generator and/or a wind power generator. Examples of the electric vehicle 3011 include an electric car, a hybrid car, an electric motorcycle, an electric bicycle, and/or Segway (registered trademark). Examples of the centralized power system 3022 include a commercial power source, a power generation device, a power transmission network, and/or a smart grid (for example, next generation power transmission network). Furthermore, examples thereof include a thermal power plant, a nuclear power plant, a hydraulic power plant, and/or a wind power plant. Examples of the power generation device included in the centralized power system 3022 include various solar batteries, a fuel battery, a wind power generation device, a micro hydraulic power generation device, and/or a geothermal power generation device. However, the centralized power system 3022 and the power generation device are not limited thereto.

The control unit 3001 is a unit that controls operation of the entire power storage system (including a used state of the power source 3002), and includes a CPU, for example. The power source 3002 can include one or two or more magnesium secondary batteries (not shown). The smart meter 3003 is, for example, a network-compatible power meter to be installed in the house 3000 on the power demand side, and can communicate with the power supply side. The smart meter 3003 can efficiently and stably supply energy, for example, by controlling the balance between demand and supply in the house 3000 while communicating with outside.

In such a power storage system, for example, electric power is accumulated in the power source 3002 from the centralized power system 3022 as an external power source via the smart meter 3003 and the power hub 3004, and electric power is accumulated in the power source 3002 from the private power generator 3021 as an independent power source via the power hub 3004. The electric power accumulated in the power source 3002 is supplied to the electric device (for example, electronic device) 3010 and the electric vehicle 3011 according to an instruction of the control unit 3001, so that the electric device (for example, electronic device) 3010 can operate and the electric vehicle 3011 can be charged. That is, the power storage system is a system which makes it possible to accumulate and supply electric power in the house 3000 using the power source 3002.

The electric power accumulated in the power source 3002 can be arbitrarily used. Therefore, for example, it is possible to accumulate electric power from the centralized power system 3022 to the power source 3002 during the midnight when the electricity charge is low and use the electric power accumulated in the power source 3002 during the daytime when the electricity charge is high.

The power storage system described above may be installed in each house (for example, each household) or may be installed in every two or more houses (for example, two or more households).

Next, application of the magnesium secondary battery to an electric tool will be described. FIG. 8C shows a block diagram showing a configuration of the electric tool. The electric tool is, for example, an electric drill, and includes a control unit 4001 and a power source 4002 inside a tool body 4000 including a plastic material or the like. For example, a drill unit 4003, which is a movable portion, is rotatably attached to the tool body 4000. The control unit 4001 is a unit that controls the operation of the entire electric tool (including a used state of the power source 4002), and includes a CPU, for example. The power source 4002 can include one or two or more magnesium secondary batteries according (not shown). The control unit 4001 supplies electric power from the power source 4002 to the drill unit 4003 in response to the operation of an operation switch (not shown).

Although the present application has been described above, only typical examples have been described. Accordingly, the present application is not limited such description, and those skilled in the art will readily understand that various modes can be conceived for the present technology. For example, the present technology can be modified in design, and the features described herein may be combined.

For example, the composition of the electrolytic solution, the raw materials used for production, the production method, the production conditions, the characteristics of the electrolytic solution, the electrochemical device, and the configuration or structure of the battery described above are examples, and the present application is not limited to these, and those can be changed appropriately. The electrolytic solution according to an embodiment can also be mixed with an organic polymer (for example, polyethylene oxide, polyacrylonitrile and/or polyvinylidene fluoride (PVdF)) and used as a gel electrolyte.

The effects described in the present description are merely illustrative and are not restrictive, and an additional effect may be present.

In the electrochemical device according to an embodiment, the electrolytic solution contains a solvent and a magnesium salt contained in the solvent, but the presence of components that may be unavoidably or accidentally mixed at the time of the preparation, storage, and/or use of the electrolytic solution (for example, components in amounts that can be recognized as trace amounts or ultramicro amounts to those skilled in the art, such as trace or ultramicro amounts of components) can be allowed.

EXAMPLES

Hereinafter, the present application will be described more specifically with reference to Examples, but the present application is not limited to these Examples.

For example, the following demonstration test was carried out. Specifically, a demonstration test was carried out on whether or not the contact of an electrode containing magnesium with a fullerene analogue-containing layer contributes to improvement of an electrochemical device in energy density and cycle characteristics.

Energy Density

Example 1

As an electrochemical device, a magnesium-sulfur secondary battery having the following specifications was produced.

(Specifications of Magnesium-Sulfur Secondary Battery)

Figure 9:
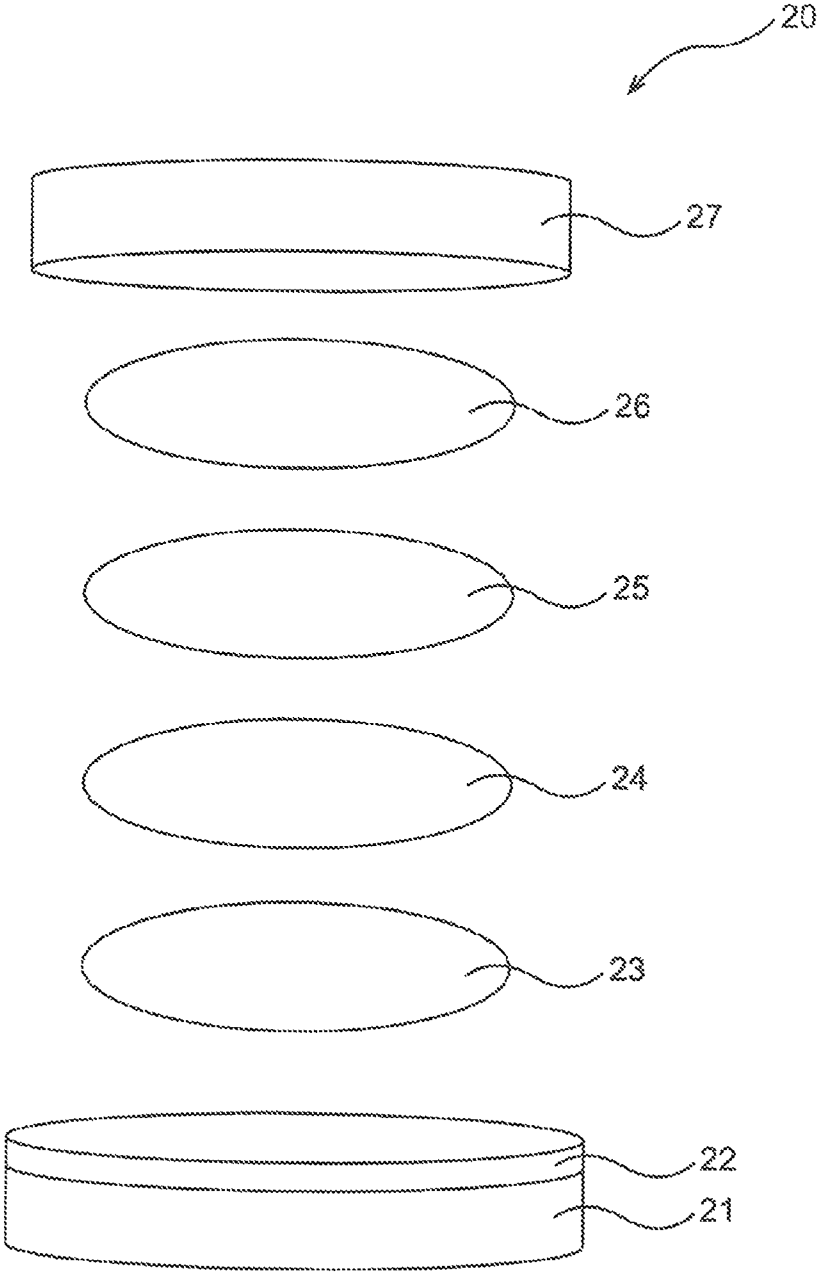
FIG. 9 is a developed view schematically illustrating a battery produced in EXAMPLES of the present description.

- Negative electrode: Electrode containing magnesium (Mg plate having a diameter of 15 mm and a thickness of 200 μm (magnesium plate having a purity of 99.9% and manufactured by Rikazai Co., Ltd.); the Mg plate is covered with fullerene)
- Positive electrode: Sulfur electrode (electrode containing 10% by mass of $S_8$ sulfur, product number 197-17892, manufactured by Wako Pure Chemical Industries, Ltd.; containing 65% by mass of Ketjen Black (KB), product number ECP600JD, manufactured by Lion Corporation as a conductive aid; containing 25% by mass of polytetrafluoroethylene (PTFE), product number CD-1E, manufactured by Asahi Glass Co., Ltd. as a binder; and containing nickel (15 mm in diameter) as a current collector)
- Separator: Glass fiber (glass fiber manufactured by Advantec, product number GC50)
- Electrolytic Solution
  - Magnesium salt: Halogen metal salt ($MgCl_2$ (anhydride): manufactured by Sigma-Aldrich Co. LLC, product number 449172, 0.8 M) and imide metal salt ($Mg(TFSI)_2$: manufactured by Tomiyama Pure Chemical Industries, Ltd., product number MGTFSI, 0.8 M)
  - Linear ether solvent: Diethylene glycol dimethyl ether (dimethoxyethane) (super-dehydrated product), (manufactured by Tomiyama Pure Chemical Industries, Ltd., product number G2)
  - “Fullerene analogue”: $C_{60}$ fullerene 0.01 M (manufactured by Sigma-Aldrich Co. LLC, product number 379646)
- Secondary battery form: Coin battery CR2016 type FIG. 9 shows a schematic developed view of the battery produced. Regarding the positive electrode 23, 10% by mass of sulfur ($S_8$), 60% by mass of Ketjen black as a conductive aid, and 30% by mass of polytetrafluoroethylene (PTFE) as a binder were mixed using an agate mortar. Then, the resulting mixture was rolled about 10 times using a roller compactor while being softened with acetone. Thereafter, the resultant was dried by vacuum drying at 70° C. for 12 hours. Thus, the positive electrode 23 was successfully obtained. A nickel mesh was used as a current collector and was used with attachment to the positive electrode.

Fullerene was dispersed in toluene to prepare a fullerene suspension. The fullerene suspension was dropped onto a Mg plate to form a coating film. The coating film was dried to form a fullerene analogue-containing layer on the Mg plate. Thus, a negative electrode covered with the fullerene analogue-containing layer was produced. The observation of a surface of the Mg plate with an optical microscope confirmed that the surface of the Mg plate was discontinuously covered with the fullerene analogue-containing layer.

A gasket 22 was placed on a coin battery can 21, on which a positive electrode 23 made of sulfur, a separator 24 made of glass fiber, a negative electrode 25 made of a Mg plate having a diameter of 15 mm and a thickness of 200 μm, a spacer 26 made of a stainless steel plate having a thickness of 0.5 mm, and a coin battery lid 27 were stacked in this order, and then sealed by crimping the coin battery can 21.

The spacer 26 was spot-welded to the coin battery lid 27 in advance. The electrolytic solution was used in the form of being contained in the separator 24 of the coin battery 20.

The battery produced was subjected to charge and discharge. The charge and discharge conditions are as follows.

(Charge and Discharge Conditions)

Discharge conditions: CC discharge 0.1 mA/0.7 V cutoff

Charge conditions: CC charge 0.1 mA/2.2 V cutoff

Temperature: 25° C.

Example 2

A magnesium-sulfur secondary battery was produced in the same manner as in Example 1 except that a Mg plate (Mg plate not covered with a fullerene-containing layer) was used in place of the "Mg plate covered with a fullerene analogue-containing layer" and a "separator containing fullerene" was used in place of the "separator" in Example 1, and the magnesium-sulfur secondary battery was charged and discharged in the same manner as in Example 1.

The separator containing fullerene was prepared by dropping the fullerene suspension prepared in Example 1 onto a separator (one side of a planar separator) and drying the suspension. The observation of the produced separator with an optical microscope confirmed that the surface of the separator was discontinuously covered with the fullerene-containing layer. In the production of the coin battery, the separator was stacked on the negative electrode such that the surface on which the fullerene analogue-containing layer was formed was in contact with the negative electrode.

Comparative Example 1

A magnesium-sulfur secondary battery was produced in the same manner as in Example 1 except that a Mg plate (Mg plate not covered with a fullerene-containing layer) was used in place of the "Mg plate covered with a fullerene analogue-containing layer" and a sulfur electrode covered with a fullerene analogue-containing layer was used in place of the sulfur electrode (sulfur electrode not covered with a fullerene analogue-containing layer) in Example 1, and the magnesium-sulfur secondary battery was charged and discharged in the same manner as in Example 1.

(Results)

Figure 10:
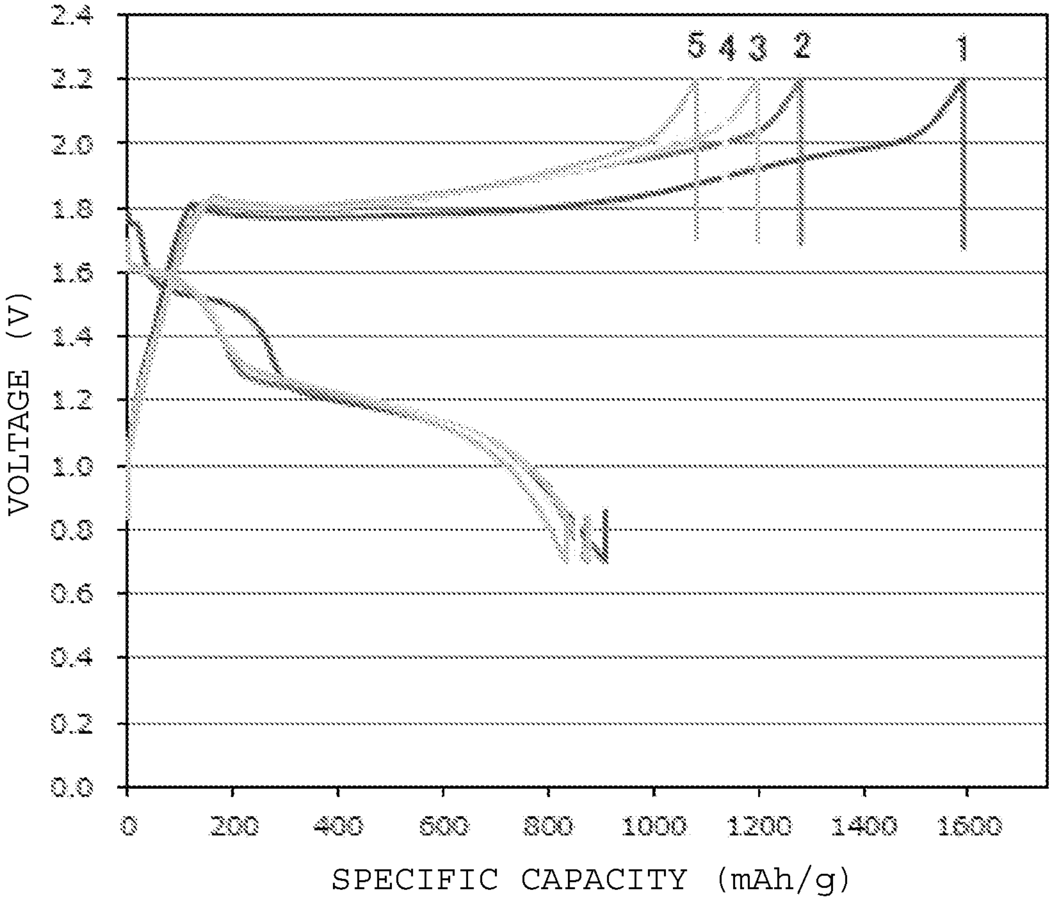
FIG. 10 shows a result of a charge/discharge curve obtained in EXAMPLES of the present description (Example 1).
Figure 11:
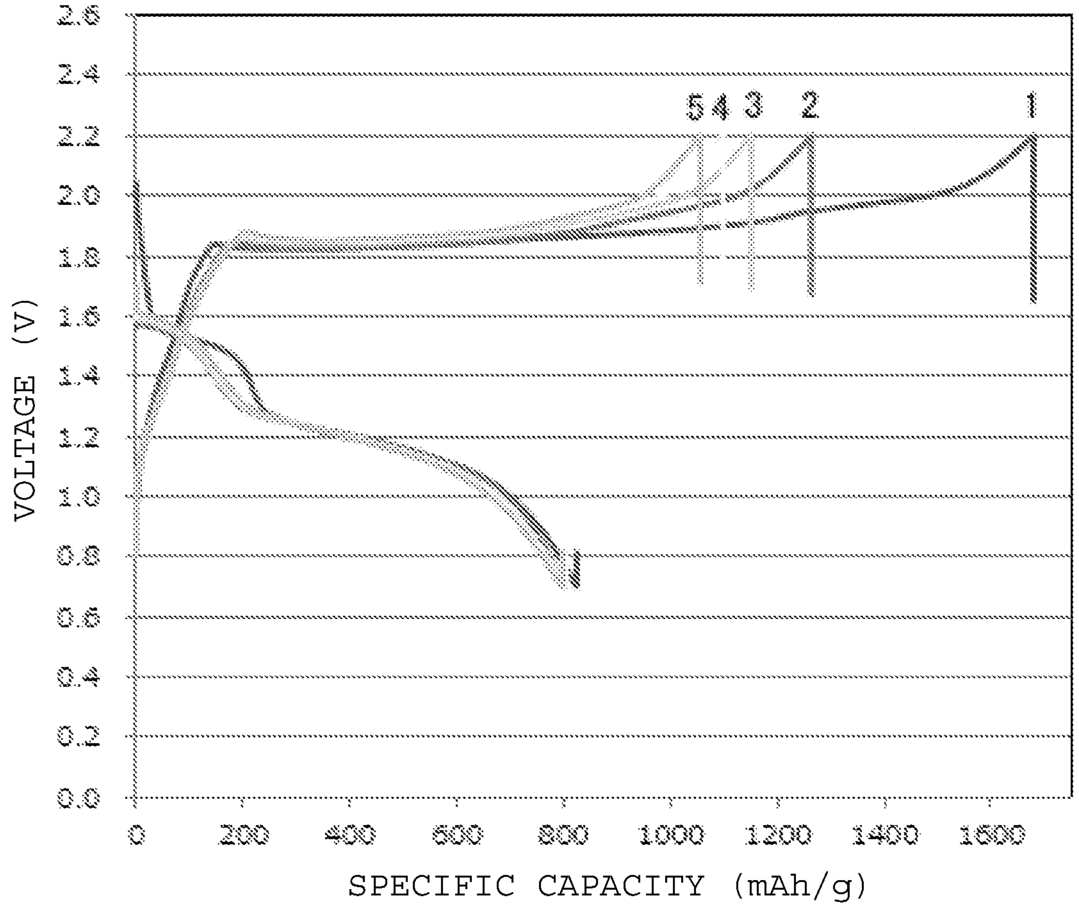
FIG. 11 shows a result of a charge/discharge curve obtained in EXAMPLES of the present description (Example 2).
Figure 12:
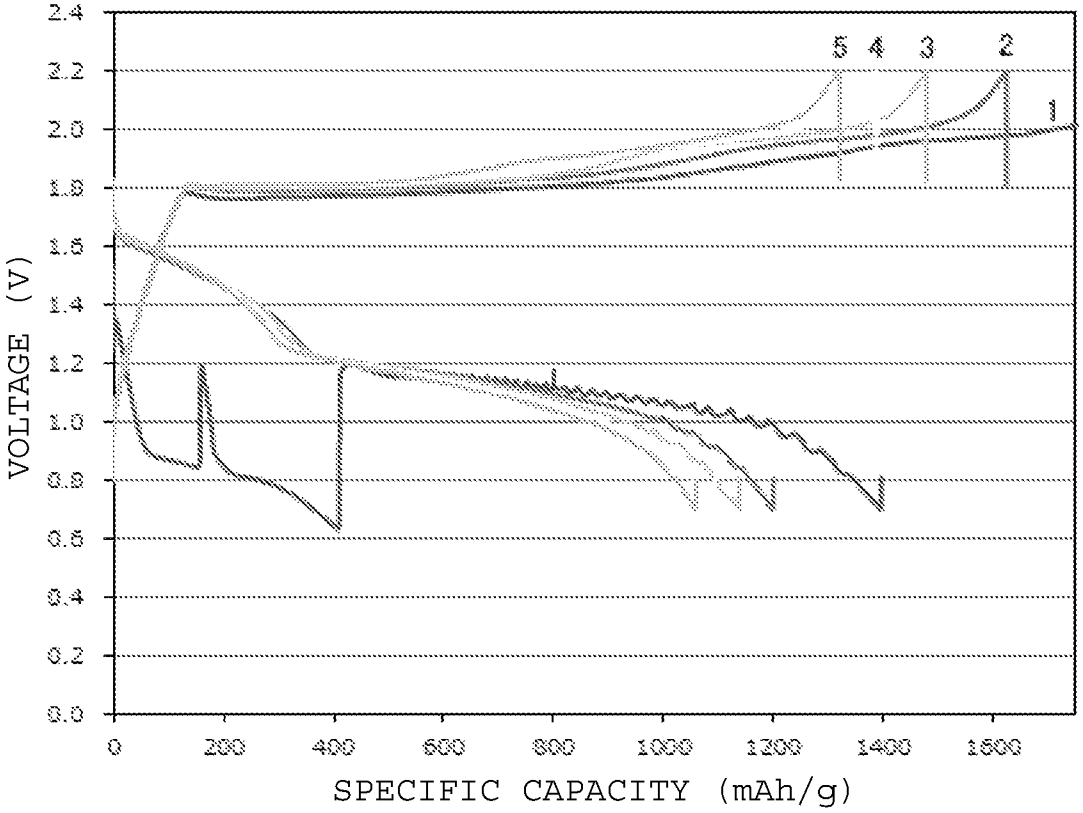
FIG. 12 shows a result of a charge/discharge curve obtained in EXAMPLES of the present description (Comparative Example 1).

The results are shown in FIGS. 10 to 12. FIGS. 10 to 12 show the charge/discharge curves in Example 1, Example 2, and Comparative Example 1, respectively. The numbers attached to the charge/discharge curves each indicate the number of cycles. It was found that the first discharge curves (1 cycle) of Examples 1 and 2 were larger than the discharge curve of Comparative Example 1. That is, it was found that the discharge voltages of Examples 1 and 2 were higher than the discharge voltage of Comparative Example 1.

The above results revealed that owing to the fact that a negative electrode is in contact with a fullerene analogue-containing layer as in the case where the fullerene analogue-containing layer is a separator or in the case where the fullerene analogue-containing layer is a cover layer covering the negative electrode, voltage drop due to negative electrode overvoltage at the time of initial discharge of a magnesium-sulfur secondary battery (electrochemical device) is controlled and the energy density is increased. This contributes to an electrochemical device having a high energy density.

Cycle Characteristics

Example 3

From the charge/discharge curve obtained in Example 1, a relationship between the specific capacity and the number of cycles (the attenuation curve represented by solid line in FIG. 13) was obtained.

Comparative Example 2

A magnesium-sulfur secondary battery was produced in the same manner as in Example 3 except that a Mg plate (Mg plate not covered with a fullerene-containing layer) was used in place of the "Mg plate covered with a fullerene analogue-containing layer", and the magnesium-sulfur secondary battery was charged and discharged in the same manner as in Example 3. From the charge/discharge curve obtained, a relationship between the specific capacity and the number of cycles (the attenuation curve represented by broken line in FIG. 13) was obtained.

A fullerene suspension was prepared in the same manner as in Example 1. The fullerene suspension was dropped onto a sulfur electrode to form a coating film. The coating film was dried to form a fullerene analogue-containing layer on the sulfur electrode (positive electrode). Thus, a positive electrode covered with the fullerene analogue-containing layer was produced. The observation of a surface of the sulfur electrode with an optical microscope confirmed that the surface of the sulfur electrode was discontinuously covered with the fullerene analogue-containing layer.

(Results)

Figure 13:
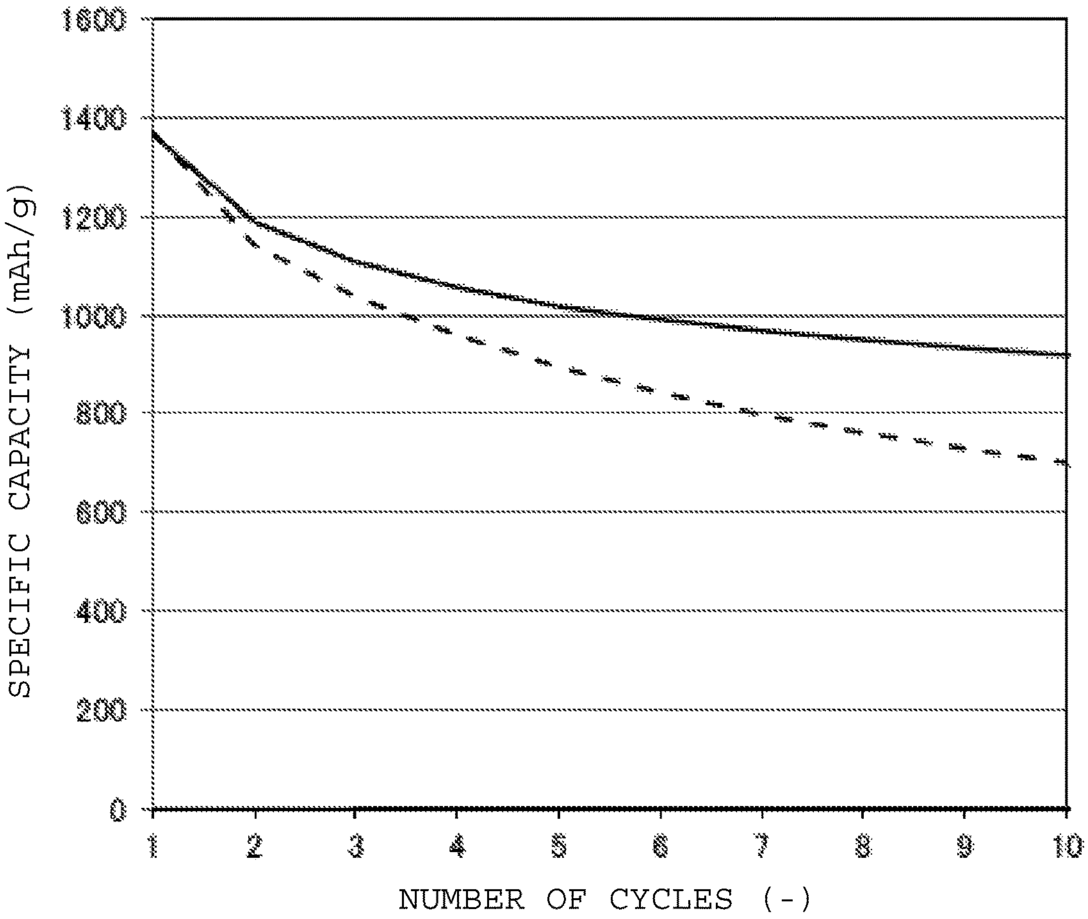
FIG. 13 shows a relationship between a specific capacity and a discharge voltage obtained in EXAMPLES of the present description (Example 3 and Comparative Example 2).

The results are shown in FIG. 13. The attenuation curves drawn by the solid line and the broken line in FIG. 13 indicate the attenuation curves in Example 3 and Comparative Example 2, respectively. It was found that the attenuation curve of Example 3 was more gently attenuated as the number of cycles increased as compared with the attenuation curve of Comparative Example 2. The ratio (discharge capacity retention ratio) of the specific capacity at the time of 10-cycles discharge to the specific capacity at the time of the first (1-cycle) discharge was 65% in Example 3 and 50% in Comparative Example 2. It was found that the discharge capacity retention ratio of Example 3 was increased by 15% with respect to the discharge capacity retention ratio of Comparative Example 2.

From the above results, it is clear that owing to the fact that a negative electrode is in contact with a fullerene analogue-containing layer as in the case where the fullerene analogue-containing layer is a separator or the case where the fullerene analogue-containing layer is a cover layer covering the negative electrode, the decrease in discharge capacity due to the cycle progress of a magnesium-sulfur secondary battery (electrochemical device) is controlled and the cycle characteristics are improved. This contributes to lifetime enhancement of electrochemical devices.

INDUSTRIAL APPLICABILITY

The electrochemical device of the present application can be used in various fields of extracting energy using an electrochemical reaction. The electrochemical device of the present application is used not only as a secondary battery but also as various electrochemical devices such as a capacitor, an air battery, and a fuel cell, which are merely examples.

DESCRIPTION OF REFERENCE SYMBOLS

1: Negative electrode
2: Fullerene analogue-containing layer
2*a*: Fullerene analogue particles
10: Positive electrode
11: Negative electrode
12: Electrolyte layer
20: Coin battery
21: Coin battery can
22: Gasket
23: Positive electrode
24: Separator
25: Negative electrode
26: Spacer
27: Coin battery lid
31: Positive electrode
32: Negative electrode
33: Separator
35, 36: Current collector
37: Gasket
41: Porous positive electrode
42: Negative electrode
43: Separator and electrolytic solution
44: Air electrode side current collector
45: Negative electrode side current collector
46: Diffusion layer
47: Oxygen-selective permeable film
48: Exterior body
51: Air (atmosphere)
52: Oxygen
61: Positive electrode
62: Positive electrode electrolytic solution
63: Positive electrode electrolytic solution transport pump
64: Fuel flow path
65: Positive electrode electrolytic solution storage container
71: Negative electrode
72: Negative electrode electrolytic solution
73: Negative electrode electrolytic solution transport pump
74: Fuel flow path
75: Negative electrode electrolytic solution storage container
66: Ion exchange membrane
100: Magnesium secondary battery
111: Electrode structure housing member (battery can)
112, 113: Insulating plate
114: Battery lid
115: Safety valve mechanism
115A: Disk plate
116: Positive temperature coefficient element (PTC element)
117: Gasket
118: Center pin
121: Electrode structure
122: Positive electrode
123: Positive electrode lead portion
124: Negative electrode
125: Negative electrode lead portion
126: Separator
200: Exterior member
201: Close contact film
221: Electrode structure
223: Positive electrode lead portion
225: Negative electrode lead portion
1001: Cell (assembled battery)
1002: Magnesium secondary battery
1010: Control unit
1011: Memory
1012: Voltage measurement unit
1013: Current measurement unit
1014: Current detection resistor
1015: Temperature measurement unit
1016: Temperature detection element
1020: Switch control unit
1021: Switch unit
1022: Charge control switch
1024: Discharge control switch
1023, 1025: Diode
1031: Positive electrode terminal
1032: Negative electrode terminal
CO, DO: Control signal
2000: Housing
2001: Control unit
2002: Various sensors
2003: Power source
2010: Engine
2011: Power generator
2012, 2013: Inverter
2014: Driving motor
2015: Differential device
2016: Transmission
2017: Clutch
2021: Front wheel drive shaft
2022: Front wheel
2023: Rear wheel drive shaft
2024: Rear wheel
3000: House
3001: Control unit
3002: Power source
3003: Smart meter
3004: Power hub
3010: Electric device (electronic device)
3011: Electric vehicle
3021: Private power generator
3022: Centralized power system
4000: Tool body
4001: Control unit
4002: Power source
4003: Drill unit It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. An electrochemical device comprising a negative electrode, a positive electrode, and a separator disposed between the negative electrode and the positive electrode, wherein the negative electrode is an electrode containing magnesium, an electrolytic solution of the electrochemical device comprises a solvent and a magnesium salt contained in the solvent, and the negative electrode is in contact with a fullerene analogue-containing layer comprising a fullerene analogue including a plurality of fullerene analogue particles, wherein the fullerene analogue-containing layer is the separator or a cover layer covering the negative electrode, and wherein the positive electrode is a sulfur electrode comprising sulfur.

2. The electrochemical device according to claim 1, wherein the fullerene analogue is at least one fullerene selected from the group consisting of $C_{60}$, $C_{70}$, $C_{84}$, $C_{90}$, and $C_{96}$.

3. The electrochemical device according to claim 1, wherein the magnesium salt is at least one magnesium salt selected from the group consisting of magnesium halide, magnesium perfluoroalkylsulfonylimide, and magnesium bishexaalkyldisilazide.

4. The electrochemical device according to claim 1, wherein the solvent is at least one solvent selected from the group consisting of a linear ether, a cyclic ether, and a dialkylsulfone.

5. The electrochemical device according to claim 4, wherein the linear ether is an ether having an ethyleneoxy structural unit represented by a general formula:

[Chemical Formula 1]

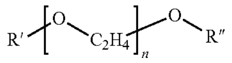

wherein R' and R" are each independently a hydrocarbon group having 1 to 10 carbon atoms, and are the same or different from each other, and n is an integer of 1 to 10.

6. The electrochemical device according to claim 1, wherein the cover layer includes the plurality of fullerene analogue particles in contact with a surface of the negative electrode.

7. The electrochemical device according to claim 1, wherein the separator includes the plurality of fullerene analogue particles in contact with a surface of the negative electrode.

* * * * *